(12) United States Patent
Fukumoto

(10) Patent No.: US 6,775,221 B1
(45) Date of Patent: Aug. 10, 2004

(54) OPTICAL PICKUP AND RECORDING AND/ OR REPRODUCING APPARATUS

(75) Inventor: Atsushi Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 759 days.

(21) Appl. No.: 09/695,665

(22) Filed: Oct. 24, 2000

(30) Foreign Application Priority Data

Nov. 30, 1999 (JP) .......................................... P11-340862

(51) Int. Cl.$^7$ .............................................. G11B 7/00
(52) U.S. Cl. ............................. 369/112.16; 369/109.01
(58) Field of Search .......................... 369/44.23, 44.14, 369/112.01, 112.16, 112.17, 112.18, 112.19, 112.23, 109.01, 110.02, 110.03, 110.04

(56) References Cited

U.S. PATENT DOCUMENTS 5,519,685 A * 5/1996 Kato et al. ............. 369/112.19
6,400,664 B1 * 6/2002 Shimano et al. ......... 369/44.37

* cited by examiner

Primary Examiner—Paul W. Huber
(74) Attorney, Agent, or Firm—Oblon, Spivak, McClelland, Maier & Neustadt, P.C.

(57) ABSTRACT

An optical pickup provided with a semiconductor laser for outputting a linear polarized laser beam, an objective lens for condensing a laser beam from the semiconductor laser and supplying the same to a track of an optical disk with lands and/or grooves formed therein, a polarization plate supplied with the laser beam reflected at the optical disk via the objective lens and a beam splitter, and changing an overlapping region in which a 0-th order diffraction light and a 1st order diffraction light contained in the supplied laser beam overlap and a nonoverlapping region to linear polarized light orthogonal or substantially orthogonal to each other, and a photo detector supplied with the laser beam passed through the polarization plate via a focus lens and a cylindrical lens.

6 Claims, 16 Drawing Sheets

FIG. 11
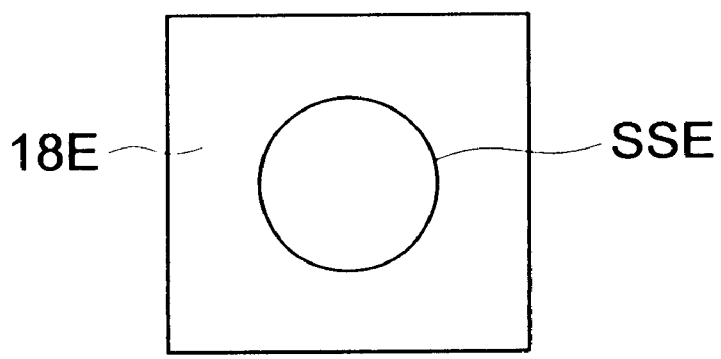
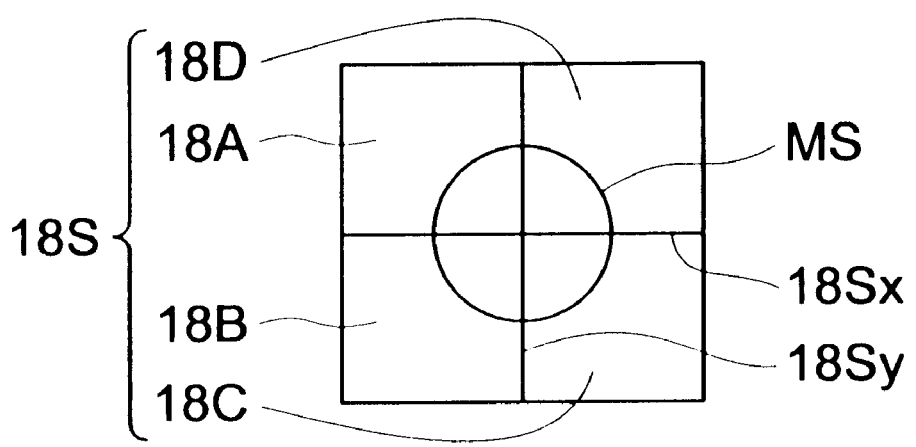
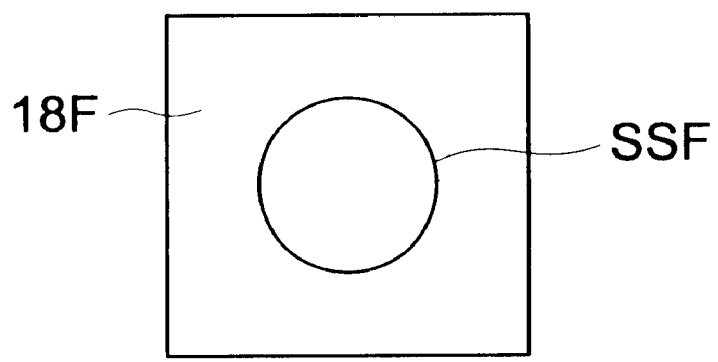

OPTICAL PICKUP AND RECORDING AND/OR REPRODUCING APPARATUS

BACKGROUND OF THE INVENTION

1. Field of the Invention

The present invention relates to an optical pickup and a recording and/or reproducing apparatus focusing a laser beam on an optical disk.

2. Description of the Related Art

FIG. 1 is a view of the configuration of an optical pickup of the related art.

This optical pickup 1 has a semiconductor laser 4, a collimator lens 5, a beam splitter 3, an objective lens 2, a focus lens 6, a cylindrical lens 7, and a photo detector 8.

The semiconductor laser 4 outputs a linear polarized laser beam and supplies the same to the collimator lens 5.

The collimator lens 5 collimates the laser beam from the semiconductor laser 4 to a parallel beam and supplies the same to the beam splitter 3.

The beam splitter 3 passes the laser beam from the collimator lens 5 therethrough and supplies it to the objective lens 2.

The objective lens 2 condenses the laser beam from the beam splitter 3 and supplies it to a track of an optical disk 80.

Further, the objective lens 2 returns the laser beam reflected at the optical disk 80 to the beam splitter 3.

The beam splitter 3 receives the laser beam from the optical disk 2 and reflects the incident laser beam and supplies it to the focus lens 6.

The focus lens 6 focuses the laser beam from the beam splitter 3 and supplies it to the cylindrical lens 7.

The cylindrical lens 7 passes the laser beam from the focus lens 6 and supplies it to the photo detector 8.

The photo detector 8 receives the laser beam from the cylindrical lens 7 at its light receiving portion and generates an output signal.

FIG. 2 is an explanatory diagram of the configuration of the light receiving portion of the photo detector 8.

The photo detector 8 is a four-divided photo detector obtained by equally dividing a light receiving portion 8S to four by two division lines 8Sx and 8Sy.

The light receiving portion 8S has four divided regions 8A to 8D. In the light receiving portion 8S of FIG. 2, a beam spot MS is formed by the laser beam from the cylindrical lens 7.

The direction of the generatrix of the cylindrical lens 7 forms an angle of about 45 degrees or about 135 degrees with respect to the direction of the division line 8Sx or division line 8Sy of the light receiving portion 8S.

The intersecting point of the division lines 8Sx and 8Sy is located at the center or substantially the center of the laser beam passing through the cylindrical lens 7.

The shape of the beam spot MS formed at the light receiving portion 8S changes in a diagonal direction in accordance with the distance between the optical disk 80 and the objective lens 2, so it is possible to detect focus deviation at the optical disk 80 by an astigmatism method based on output signals generated by the divided regions 8A to 8D.

A focus error signal FE is expressed by the following equation (1) by using output signals SA to SD generated by the divided regions 8A to 8D.

$$FE = SA + SC - (SB + SD) \tag{1}$$

Summarizing the problem to be solved by the invention, in an optical disk of a structure having lands and grooves, the focus error signal FE becomes a different value depending on whether the position of the focus is on a land or is in a groove. This will be explained by referring to FIG. 3.

FIG. 3 is a graph showing various focus error signals with respect to the lands and the grooves. A focus error signal in the case where the track is a land is indicated by a dotted line LA, while a focus error signal in the case where the track is a groove is indicated by a dotted line GR.

The curves LA and GR of the focus error signals shown in FIG. 3 are expressed as values of percentage ($100 \times FE/\Sigma$) obtained by standardizing (normalizing) the value obtained by equation (1) by a sum $\Sigma$ (=SA+SB+SC+SD) of the output signals SA to SD for convenience. Further, the relative distance from the focus position (focused position) where the laser beam from the objective lens is condensed to a recording surface of the optical disk is defined as an amount of defocus.

In a mirror disk, an optical disk of a structure with no grooves, when the recording surface is located at the focused position, the value of the focus error signal becomes 0.

In an optical disk having a land and groove structure, however, when the recording surface of the optical disk is located at the focused position and the beam is focused (where the amount of defocus is 0), the value of the focus error signal does not become 0. This is because diffraction of light due to the lands and/or grooves occurs when the laser beam is reflected at the track, interference of the light occurs at the light receiving portion of the photo detector, and an offset occurs in the focus error signal at the time of focusing.

Further, when the ratio of the widths of the lands and the grooves, the depth of the grooves, etc. differ due to the differences of the optical disks, the value of the detection error in focus detection at the focused position changes. Namely, accurate detection of the focus error has been difficult in the method of the related art not only in optical disks of the land and groove structure, but in all optical disks having any groove widths and depths.

SUMMARY OF THE INVENTION

An object of the present invention is to provide an optical pickup and a recording and/or reproducing apparatus capable of preventing interference of light in a photo detector.

A laser beam reflected at a track of an optical disk having land and/or grooves includes 0-th order diffraction light and +1st order diffraction light created due to the diffraction by the lands and/or grooves.

It can be considered that, by passing this laser beam containing the 0-th order diffraction light and the +1st order diffraction light through a cylindrical lens and supplying this to the photo detector, interference of light occurs between a region in which the 0-th order diffraction light and the +1st order diffraction light overlap and a region in which they do not overlap, beam spots of the light receiving portion form an asymmetric intensity distribution with respect to the division lines at the time of focus, and therefore the focus error signal does not become 0 at the time of focus as shown in FIG. 3 described above.

FIG. 4 is an explanatory view of the state of the laser beam (returned laser beam) reflected at the beam splitter 3 and supplied to the focus lens 6 in the optical pickup 1 of FIG. 1, in which a contour of the 0-th order diffraction light is indicated by a solid line ring, and the contour of the +1st order diffraction light is indicated by a broken line ring.

A distance d0 up to the center of the +1st order diffraction light with respect to the center of the 0-th order diffraction light is expressed by the following equation (2) by a pitch p in a radius direction of the groove, a wavelength λ of the laser beam, and a numerical aperture NA of the objective lens 2:

$$d0=(\lambda/NA)/p \qquad (2)$$

Here, the radius of the 0-th order diffraction light determined by the radius of the objective lens 2 was standardized (normalized) and defined as 1. The radius of this 0-th order diffraction light is equal to the radius of the +1st order diffraction light and corresponds to the radius (or aperture) of the objective lens 2.

In the explanatory diagram of FIG. 4, the case where d0=1, that is the case where λ/NA=p, is exemplified, and the contours of the +1st order diffraction light contact each other. If parameters such as the wavelength λ, numerical aperture NA, and the pitch p are determined, the region in which the 0-th order diffraction light and the +1st order diffraction light overlap (overlapping region) and the region where they do not overlap (nonoverlapping region) are uniquely determined.

In the optical pickup and the recording and/or reproducing apparatus according to the present invention, the overlapping region where the 0-th order diffraction light and the +1st order diffraction light from the optical disk 80 overlap and the nonoverlapping region are made mutually intersecting linear polarized light or substantially mutually intersecting linear polarized light.

By making the polarization directions of laser beams of the overlapping region and the nonoverlapping region perpendicularly intersect, the interference of the light at the light receiving portion of the photo detector can be suppressed, the focus error signal can be made to match between the case where the laser beam is focused and supplied to a land and the case where it is supplied to a groove and it is possible to make the focus error signal 0 at the time of focus. For example, as shown in the explanatory view of FIG. 5, the focus error signal can be made to match between the case where the focus of the laser beam is located on a land and the case where it is located in a groove and it is possible to make the focus error signal 0 at the time of focus.

Further, in another optical pickup and recording and/or reproducing apparatus according to the present invention, either of a laser beam in the overlapping region of the 0-th order diffraction light and the +1st order diffraction light and a laser beam in the nonoverlapping region is blocked.

By blocking one of the laser beams in the overlapping region and the nonoverlapping region, the interference of light in the light receiving portion of the photo detector can be eliminated, the focus error signal can be made to match between the case where the laser beam is condense and supplied to a land and the case where it is supplied to a groove, and it is possible to make the focus error signal 0 at the time of focus. For example, as shown in the graph of FIG. 5, the focus error signal can be made to match between the case where the focus of the laser beam is located on a land and the case where it is located in a groove, and it is possible to make the focus error signal 0 at the time of focus.

Below, the configurations of the optical pickup and the recording and/or reproducing apparatus according to the present invention will be described.

According to a first aspect of the present invention, there is provided an optical pickup comprising a laser for outputting a linear polarized laser beam, an objective lens for condensing a laser beam from the laser and supplying it to a track of an optical disk with lands and/or grooves formed therein, a polarization plate supplied with the laser beam reflected at the optical disk via the objective lens and polarizing an overlapping region in which a 0-th order diffraction light and a 1st order diffraction light contained in the supplied laser beam overlap and a nonoverlapping region to linear polarized light orthogonal or substantially orthogonal to each other, and a photo detector supplied with the laser beam passed through the polarization plate.

Preferably, further provision is made of a cylindrical lens supplied with the laser beam passed through the polarization plate, the photo detector has a light receiving portion for receiving the laser beam passed through the cylindrical lens, the related light receiving portion is equally divided to four or substantially equally divided to four by two orthogonal division lines, an intersecting point of the two division lines is arranged at the center or substantially the center of the laser beam passed through the cylindrical lens, and a direction of a division line and a direction of a generatrix of the cylindrical lens form an angle of about 45 degrees or about 135 degrees.

Alternatively, further provision is further made of a collimator lens for collimating the laser beam output from the laser to a parallel beam and a beam splitter supplied with the laser beam as a parallel beam from the collimator lens, the objective lens condenses the laser beam passed through the beam splitter, supplies the same to the optical disk, and returns the laser beam reflected at the optical disk to the beam splitter, and the beam splitter supplies the laser beam from the objective lens to the polarization plate.

According to a second aspect of the present invention, there is provided an optical pickup having a laser for outputting a linear polarized laser beam, an objective lens for condensing a laser beam from the laser and supplying the same to a track of an optical disk with lands and/or grooves formed therein, a Wollaston polarizing prism which is supplied with the laser beam reflected at the optical disk via the objective lens and separates the supplied laser beam to a main laser beam and first and second sub laser beams, a polarization plate supplied with the laser beams passed through the Wollaston polarizing prism and polarizing an overlapping region in which a 0-th order diffraction light and a 1st order diffraction light contained in the main laser beam among the supplied laser beams overlap and a nonoverlapping region to linear polarized light orthogonal or substantially orthogonal to each other, and a photo detector supplied with the laser beam passed through the polarization plate.

Preferably, further provision is made of a cylindrical lens supplied with the laser beam passed through the polarization plate, the photo detector has a main light receiving portion for receiving the main laser beam passed through the cylindrical lens, a first sub light receiving portion for receiving the first sub laser beam passed through the cylindrical lens, and a second sub light receiving portion for receiving the second sub laser beam passed through the cylindrical lens, the main light receiving portion is equally divided to four or substantially equally divided to four by two orthogonal division lines, an intersecting point of the two division lines is arranged at the center or substantially the center of the main laser beam passed through the cylindrical lens, a direction of a division line and a direction of a generatrix of the cylindrical lens form an angle of about 45 degrees or about 135 degrees, and the optical disk is a magneto-optical disk.

Alternatively, further provision is made of a collimator lens for collimating the laser beam output from the laser to a parallel beam and a beam splitter supplied with the laser beam as a parallel beam from the collimator lens, the objective lens condenses the laser beam passed through the beam splitter, supplies the same to the optical disk, and returns the laser beam reflected at the optical disk to the beam splitter, and the beam splitter supplies the laser beam from the objective lens to the Wollaston polarizing prism.

According to a third aspect of the present invention, there is provided an optical pickup having a laser for outputting a linear polarized laser beam, an objective lens for condensing a laser beam from the laser and supplying the same to a track of an optical disk with lands and/or grooves formed therein, a Wollaston polarizing prism which is supplied with the laser beam reflected at the optical disk via the objective lens and separates the supplied laser beam to a main laser beam and first and second sub laser beams, a substrate supplied with the laser beams passed through the Wollaston polarizing prism and allowing either of the laser beam in the overlapping region in which the 0-th order diffraction light and the 1st order diffraction light contained in the main laser beam among the supplied laser beams overlap and the laser beam in the nonoverlapping region in which they do not overlap to pass therethrough but blocking the other, and a photo detector supplied with the laser beam passed through the polarization plate.

Preferably, further provision is made of a cylindrical lens supplied with the laser beam passed through the substrate, the photo detector has a main light receiving portion for receiving the main laser beam passed through the cylindrical lens, a first sub light receiving portion for receiving the first sub laser beam passed through the cylindrical lens, and a second sub light receiving portion for receiving the second sub laser beam passed through the cylindrical lens, the main light receiving portion is equally divided to four or substantially equally divided to four by two orthogonal division lines, an intersecting point of the two division lines is arranged at the center or substantially the center of the main laser beam passed through the cylindrical lens, a direction of a division line and a direction of a generatrix of the cylindrical lens form an angle of about 45 degrees or about 135 degrees, and the optical disk is a magneto-optical disk.

Alternatively, further provision is made of a collimator lens for collimating the laser beam output from the laser to a parallel beam and a beam splitter supplied with the laser beam as a parallel beam from the collimator lens, the objective lens condenses the laser beam passed through the beam splitter, supplies the same to the optical disk, and returns the laser beam reflected at the optical disk to the beam splitter, and the beam splitter supplies the laser beam from the objective lens to the Wollaston polarizing prism.

According to a fourth aspect of the present invention, there is provided an optical pickup having a laser for outputting a linear polarized laser beam, an objective lens for condensing a laser beam from the laser and supplying the same to a track of an optical disk with lands and/or grooves formed therein, a substrate supplied with the laser beam reflected at the optical disk via the objective lens and allowing one of the laser beam in the overlapping region in which the 0-th order diffraction light and the 1st order diffraction light contained in the supplied laser beam overlap and the laser beam in the nonoverlapping region in which they do not overlap to pass therethrough but blocking the other, and a photo detector supplied with the laser beam passed through the substrate.

Preferably, further provision is made of a cylindrical lens supplied with the laser beam passed through the substrate, the photo detector has a light receiving portion for receiving the laser beam passed through the cylindrical lens, the related light receiving portion is equally divided to four or substantially equally divided to four by two orthogonal division lines, an intersecting point of the two division lines is arranged at the center or substantially the center of the laser beam passed through the cylindrical lens, and a direction of a the division line and a direction of a generatrix of the cylindrical lens form an angle of about 45 degrees or about 135 degrees.

Alternatively, further provision is made of a collimator lens for collimating the laser beam output from the laser to a parallel beam and a beam splitter supplied with the laser beam as a parallel beam from the collimator lens, the objective lens condenses the laser beam passed through the beam splitter, supplies the same to the optical disk, and returns the laser beam reflected at the optical disk to the beam splitter, and the beam splitter supplies the laser beam from the objective lens to the substrate.

According to a fifth aspect of the present invention, there is provided a first recording and/or reproducing apparatus having a laser for outputting a linear polarized laser beam, an objective lens for condensing a laser beam from the laser and supplying the same to a track of an optical disk with lands and/or grooves formed therein, a polarization plate supplied with the laser beam reflected at the optical disk via the objective lens and polarizing an overlapping region in which a 0-th order diffraction light and a 1st order diffraction light contained in the supplied laser beam overlap and a nonoverlapping region to linear polarized light orthogonal or substantially orthogonal to each other, a photo detector supplied with the laser beam passed through the polarization plate, a generation circuit for generating a focus error signal and a reproduction signal based on an output signal of the photo detector, a detection circuit for detecting recorded information of the optical disk based on the reproduction signal, and an actuator for moving the objective lens in a focus direction vertical to the recording surface of the optical disk based on the focus error signal.

More preferably, further provision is made of a cylindrical lens supplied with the laser beam passed through the polarization plate, the photo detector has a light receiving portion for receiving the laser beam passed through the cylindrical lens, the related light receiving portion is equally divided to four or substantially equally divided to four by two orthogonal division lines, an intersecting point of the two division lines is arranged at the center or substantially the center of the laser beam passed through the cylindrical lens, a direction of a division line and a direction of a generatrix of the cylindrical lens form an angle of about 45 degrees or about 135 degrees, and the generation circuit generates the focus error signal based on a difference between a sum of output signals of two divided regions located in one diagonal direction among four divided regions obtained by dividing the light receiving portion and a sum of the output signals of two divided regions located in the other diagonal direction and generates the reproduction signal based on a sum of the output signals of the four divided regions.

Still more preferably, further provision is made of a collimator lens for collimating the laser beam output from the laser to a parallel beam and a beam splitter supplied with the laser beam as a parallel beam from the collimator lens, the objective lens condenses the laser beams passed through the beam splitter, supplies the same to the optical disk, and returns the laser beam reflected at the optical disk to the beam splitter, and the beam splitter supplies the laser beam from the objective lens to the polarization plate.

According to a sixth aspect of the present invention, there is provided a laser for outputting a linear polarized laser beam, an objective lens for condensing a laser beam from the laser and supplying the same to a track of an optical disk with lands and/or grooves formed therein, a Wollaston polarizing prism which is supplied with the laser beam reflected at the optical disk via the objective lens and separates the supplied laser beam to a main laser beam and first and second sub laser beams, a polarization plate supplied with the laser beams passed through the Wollaston polarizing prism and changing an overlapping region in which a 0-th order diffraction light and a 1st order diffraction light contained in the main laser beam among the supplied laser beams overlap and a nonoverlapplng region to linear polarized light orthogonal or substantially orthogonal to each other, a photo detector supplied with the laser beam passed through the polarization plate, a generation circuit for generating a focus error signal and a reproduction signal based on an output signal of the photo detector, a detection circuit for detecting recorded information of the optical disk based on the reproduction signal, and an actuator for moving the objective lens in a focus direction vertical to the recording surface of the optical disk based on the focus error signal.

Preferably, further provision is made of a cylindrical lens supplied with the laser beam passed through the polarization plate, the photo detector has a main light receiving portion for receiving the main laser beam passed through the cylindrical lens, a first sub light receiving portion for receiving the first sub laser beam passed through the cylindrical lens, and a second sub light receiving portion for receiving the second sub laser beam passed through the cylindrical lens, the main light receiving portion is equally divided to four or substantially equally divided to four by two orthogonal division lines, an intersecting point of the two division lines is arranged at the center or substantially the center of the main laser beam passed through the cylindrical lens, a direction of a division line and a direction of a generatrix of the cylindrical lens form an angle of about 45 degrees or about 135 degrees, the optical disk is a magneto-optical disk, and the generation circuit generates the focus error signal based on a difference between a sum of output signals of two divided regions located in one diagonal direction among four divided regions obtained by dividing the light receiving portion and a sum of the output signals of two divided regions located in the other diagonal direction and generates the reproduction signal based on a difference between the output signals of the first and second sub light receiving portions.

Alternatively, further provision is made of a collimator lens for collimating the laser beam output from the laser to a parallel beam and a beam splitter supplied with the laser beam as a parallel beam from the collimator lens, the objective lens condenses the laser beam passed through the beam splitter, supplies the same to the optical disk, and returns the laser beam reflected at the optical disk to the, beam splitter, and the beam splitter supplies the laser beam from the objective lens to the Wollaston polarizing prism.

According to a seventh aspect of the present invention, there is provided a recording and/or reproducing apparatus having a laser for outputting a linear polarized laser beam, an objective lens for condensing a laser beam from the laser and supplying the same to a track of an optical disk with lands and/or grooves formed therein, a Wollaston polarizing prism which is supplied with the laser beam reflected at the optical disk via the objective lens and separates the supplied laser beam to a main laser beam and first and second sub laser beams, a substrate supplied with the laser beam passed through the Wollaston polarizing prism and allowing one of the laser beam in the overlapping region in which the 0-th order diffraction light and the 1st order diffraction light contained in the main laser beam among the supplied laser beams overlap and the laser beam in the nonoverlapping region in which they do not overlap to pass therethrough, but blocking the other, a photo detector supplied with the laser beam passed through the polarization plate, a generation circuit for generating a focus error signal and a reproduction signal based on an output signal of the photo detector, a detection circuit for detecting recorded information of the optical disk based on the reproduction signal, and an actuator for moving the objective lens in a focus direction vertical to the recording surface of the optical disk based on the focus error signal.

More preferably, further provision is made of a cylindrical lens supplied with the laser beam passed through the substrate, the photo detector has a main light receiving portion for receiving the main laser beam passed through the cylindrical lens, a first sub light receiving portion for receiving the first sub laser beam passed through the cylindrical lens, and a second sub light receiving portion for receiving the second sub laser beam passed through the cylindrical lens, the main light receiving portion is equally divided to four or substantially equally divided to four by two orthogonal division lines, an intersecting point of the two division lines is arranged at the center or substantially the center of the main laser beam passed through the cylindrical lens, a direction of a division line and a direction of a generatrix of the cylindrical lens form an angle of about 45 degrees or about 135 degrees, the optical disk is a magneto-optical disk, and the generation circuit generates the focus error signal based on a difference between a sum of output signals of two divided regions located in one diagonal direction among four divided regions obtained by dividing the light receiving portion and a sum of the output signals of two divided regions located in the other diagonal direction and generates the reproduction signal based on a difference between the output signals of the first and second sub light receiving portions.

Alternatively, further provision is made of a collimator lens for collimating the laser beam output from the laser to a parallel beam and a beam splitter supplied with the laser beam as a parallel beam from the collimator lens, the objective lens condenses the laser beams passed through the beam splitter, supplies the same to the optical disk, and returns the laser beam reflected at the optical disk to the beam splitter, and the beam splitter supplies the laser beam from the objective lens to the Wollaston polarizing prism.

According to an eighth aspect of the present invention, there is provided a recording and/or reproducing apparatus having a laser for outputting a linear polarized laser beam, an objective lens for condensing a laser beam from the laser and supplying the same to a track of an optical disk with lands and/or grooves formed therein, a substrate supplied with the laser beam reflected at the optical disk via the objective lens and allowing one of the laser beam in the overlapping region in which the 0-th order diffraction light and the 1st order diffraction light contained in the supplied laser beam overlap and the laser beam in the nonoverlapping region in which they do not overlap to pass therethrough but blocking the other, a photo detector supplied with a laser beam passed through the substrate, a generation circuit for generating a focus error signal and a reproduction signal based on an output signal of the photo detector, a detection circuit for detecting recorded information of the optical disk based on the reproduction signal, and an actuator for moving the objective lens in a focus direction vertical to the recording surface of the optical disk based on the focus error signal.

Preferably, further provision is made of a cylindrical lens supplied with the laser beam passed through the substrate, the photo detector has a light receiving portion for receiving the laser beam passed through the cylindrical lens, the related light receiving portion is equally divided to four or substantially equally divided to four by two orthogonal division lines, an intersecting point of the two division lines is arranged at the center or substantially the center of the laser beam passed through the cylindrical lens, and a direction of a division line and a direction of a generatrix of the cylindrical lens form an angle of about 45 degrees or about 135 degrees, the generation circuit generates the focus error signal based on a difference between a sum of output signals of two divided regions located in one diagonal direction among four divided regions obtained by dividing the light receiving portion and a sum of the output signals of two divided regions located in the other diagonal direction and generates the reproduction signal based on a sum of the output signals of the four divided regions.

Alternatively, further provision is made of a collimator lens for collimating the laser beam output from the laser to a parallel beam and a beam splitter supplied with the laser beam as a parallel beam from the collimator lens, the objective lens condenses the laser beams passed through the beam splitter, supplies the same to the optical disk, and returns the laser beam reflected at the optical disk to the beam splitter, and the beam splitter supplies the laser beam from the objective lens to the substrate.

BRIEF DESCRIPTION OF THE DRAWINGS

These and other objects and features of the present invention will become more apparent from the following description of the preferred embodiment given with respect to the attached drawings, in which:

FIG. 11 is an explanatory view of the configuration of a light receiving portion of the photo detector provided in the optical pickup of FIG. 10;

DESCRIPTION OF THE PREFERRED EMBODIMENTS

Below, an explanation will be made of embodiments of the present invention by referring to the attached drawings.

First Embodiment

Figure 6:
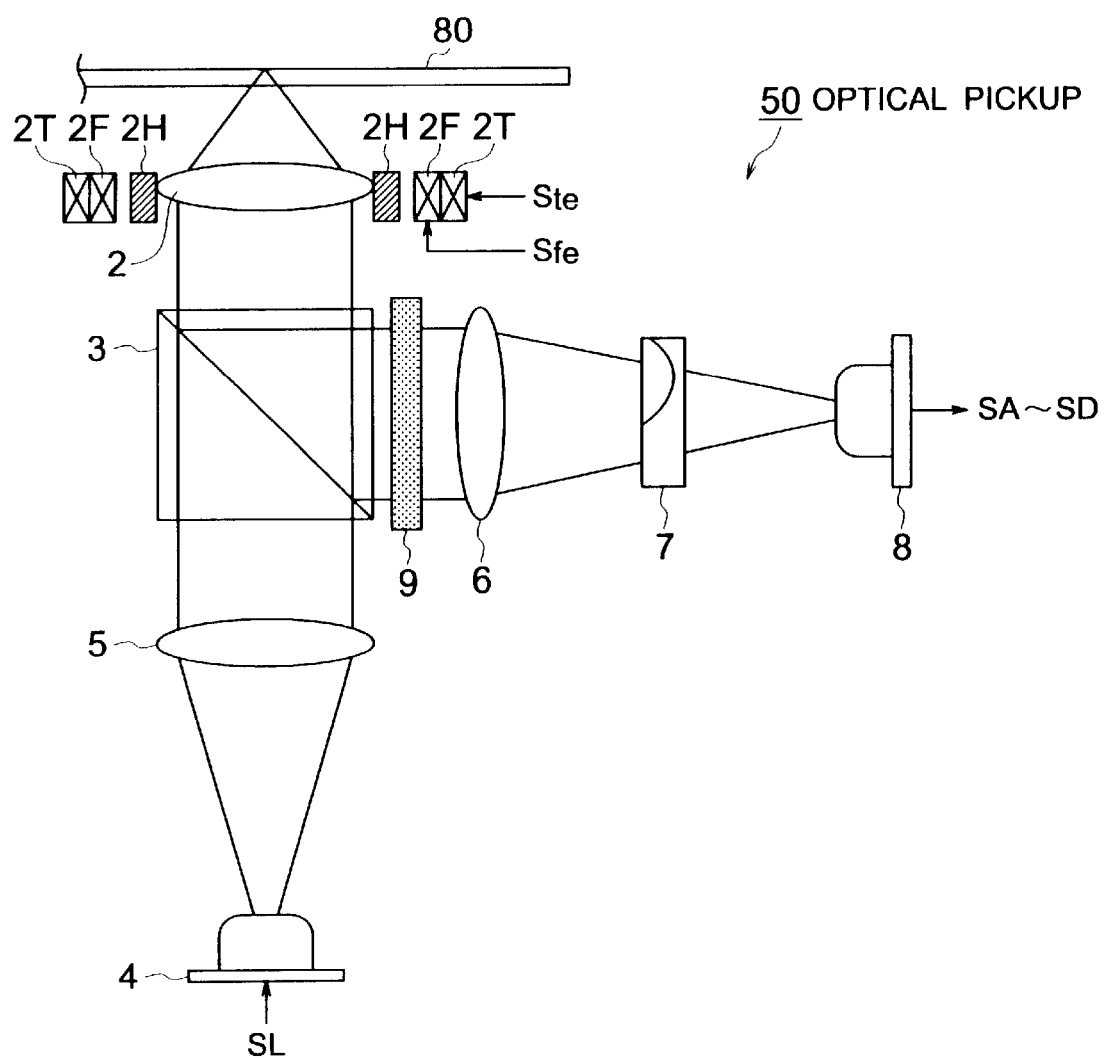
FIG. 6 is a schematic view of the configuration of a first embodiment of the optical pickup according to the present invention.

FIG. 6 is a schematic view of the configuration of an optical pickup according to a first embodiment of the present invention.

This optical pickup 50 has a semiconductor laser 4, a collimator lens 5, a beam splitter 3, an objective lens 2, a focus lens 6, a cylindrical lens 7, a photo detector 8, a polarization plate 9, a lens holder 2H, a focusing actuator 2F, and a tracking actuator 2T.

The objective lens 2 is held at the lens holder 2H.

The focusing actuator 2F moves the lens holder 2H in a focus direction vertical to the recording surface of the optical disk 80 based on a drive signal Sfe and, as a result, moves the objective lens 2 in the focus direction.

The tracking actuator 2T moves the lens holder 2H in the radius direction or a tracking direction based on a drive signal Ste and, as a result, moves the objective lens 2 in the radius direction or the tracking direction of the optical disk 80.

The semiconductor laser 4 outputs a linear polarized laser beam based on the drive signal SL and supplies the same to the collimator lens 5.

The collimator lens 5 collimates the laser beam from the semiconductor laser 4 to a parallel beam and supplies the same to the beam splitter 3.

The beam splitter 3 passes the laser beam from the collimator lens 5 therethrough and supplies the same to the objective lens 2.

The objective lens 2 condenses the laser beam from the beam splitter 3 and supplies the same to the track of an optical disk 80 having lands and/or grooves. The optical disk 80 is configured by for example a compact disk (CD), a digital versatile disc (DVD), or a phase change type optical disk (PD).

Further, the objective lens 2 returns the laser beam reflected at the optical disk 80 to the beam splitter 3.

The beam splitter 3 is struck by the laser beam from the optical disk 2 and reflects and emits the incident laser beam to supply it to the focus lens 6 via the polarization plate 9

The focus lens 6 focuses the laser beam passed through the polarization plate 9 and supplies the same to the cylindrical lens 7.

The cylindrical lens 7 passes the laser beam from the focus lens 6 therethrough and supplies the same to the photo detector 8.

The photo detector 8 receives the laser beam from the cylindrical lens 7 at its light receiving portion and generates output signals SA to SD. The light receiving portion of the photo detector 8 is given the same configuration as that of for example the light receiving portion 8S shown in FIG. 2 described above, so an explanation thereof will be omitted.

Figure 7:
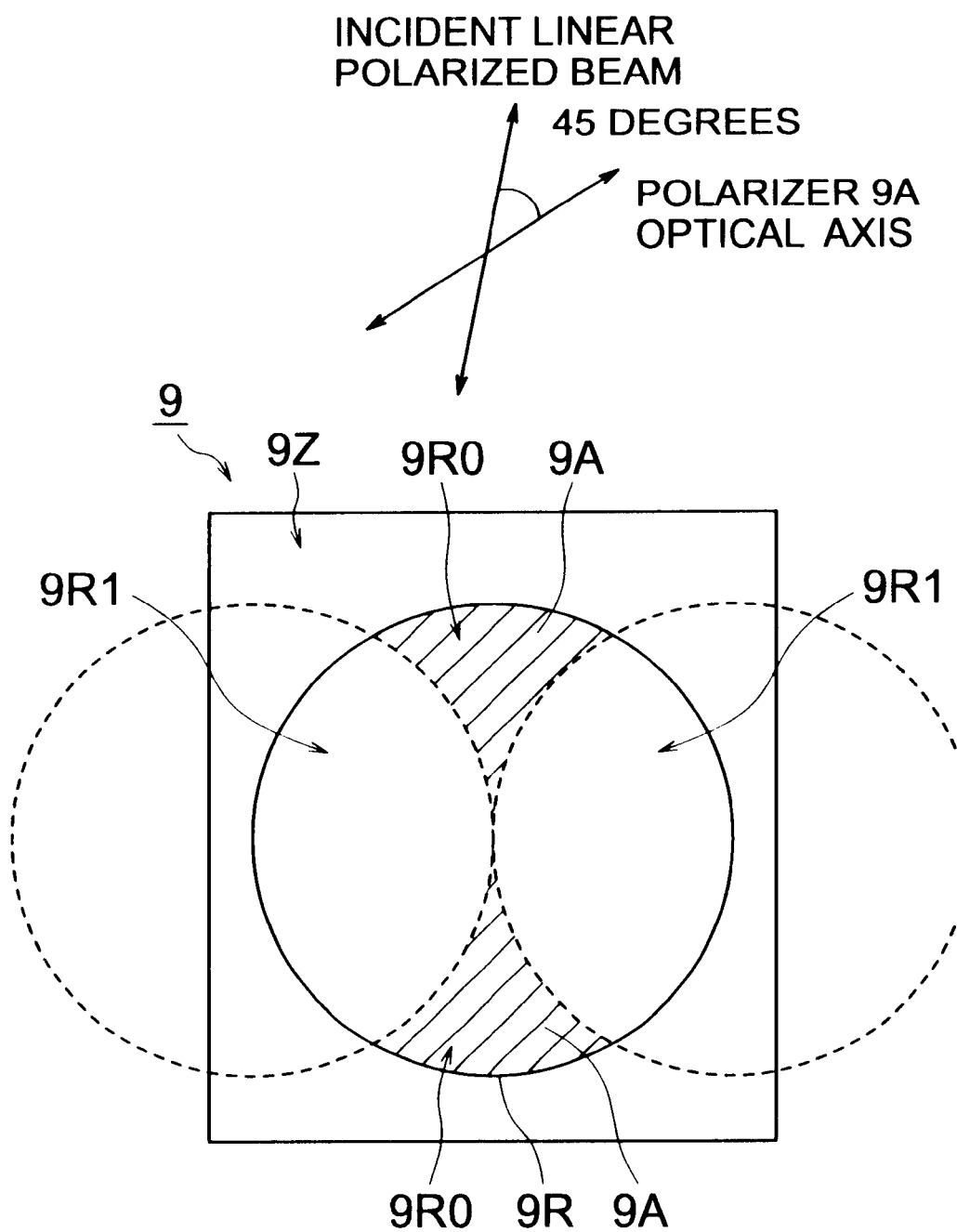
FIG. 7 is a view of the configuration of an example of a polarization plate in an optical pickup 50 of FIG. 6.

FIG. 7 is a view of the configuration of an example of the polarization plate 9 in the optical pickup 50 of FIG. 6.

The laser beam reflected at the optical disk 80 contains a 0-th order diffraction light reflected at the track and a +1st order diffraction light generated by the diffraction of the light due to the lands and/or grooves.

The polarization plate 9 is supplied with the laser beam containing the 0-th order diffraction light and the +1st order diffraction light from the beam splitter 3.

This polarization plate 9 has a transparent substrate 9Z and a polarizer 9A.

The transparent substrate 9Z has an overlapping region 9R1 in which the 0-th order diffraction light and the +1st order diffraction light overlap and a nonoverlapping region 9R0 in which they do not overlap in a contour 9R. The 0-th order diffraction light is supplied to the nonoverlapping region 9R0, and the 0-th order diffraction light and the +1st order diffraction light are supplied to the overlapping region 9R1. The polarizer 9A is located in the nonoverlapping region 9R0 of the transparent substrate 9Z.

The polarizer 9A is formed by as one example a wavelength plate having an optical axis forming an angle of about 45 degrees or about 135 degrees with respect to the polarization direction of the linear polarized laser beam supplied to the polarization plate 9 and having a phase difference corresponding to $\lambda/2$. The phase difference corresponding to $\lambda/2$ is for example a phase difference identical or substantially identical to $\{(n-1)\lambda+\lambda/2\}$ where n is a natural number.

By arranging the polarizer 9A in the nonoverlapping region 9R0, the polarization direction of the linear polarized laser beam passed through the nonoverlapping region 9R0 and the polarization direction of the linear polarized laser beam passed through the overlapping region 9R1 can be made orthogonal to each other.

When the laser beam passed through the polarization plate 9 passes through the focus lens 6 and the cylindrical lens 7 and is supplied to the photo detector 8, in the light receiving portion of the photo detector 8, interference between the laser beam passed through the nonoverlapping region 9R0 and the laser beam passed through the overlapping region 9R1 is suppressed, and asymmetry of the light intensities at the time of focus with respect to the division lines of the light receiving portion can be prevented.

Figure 1:
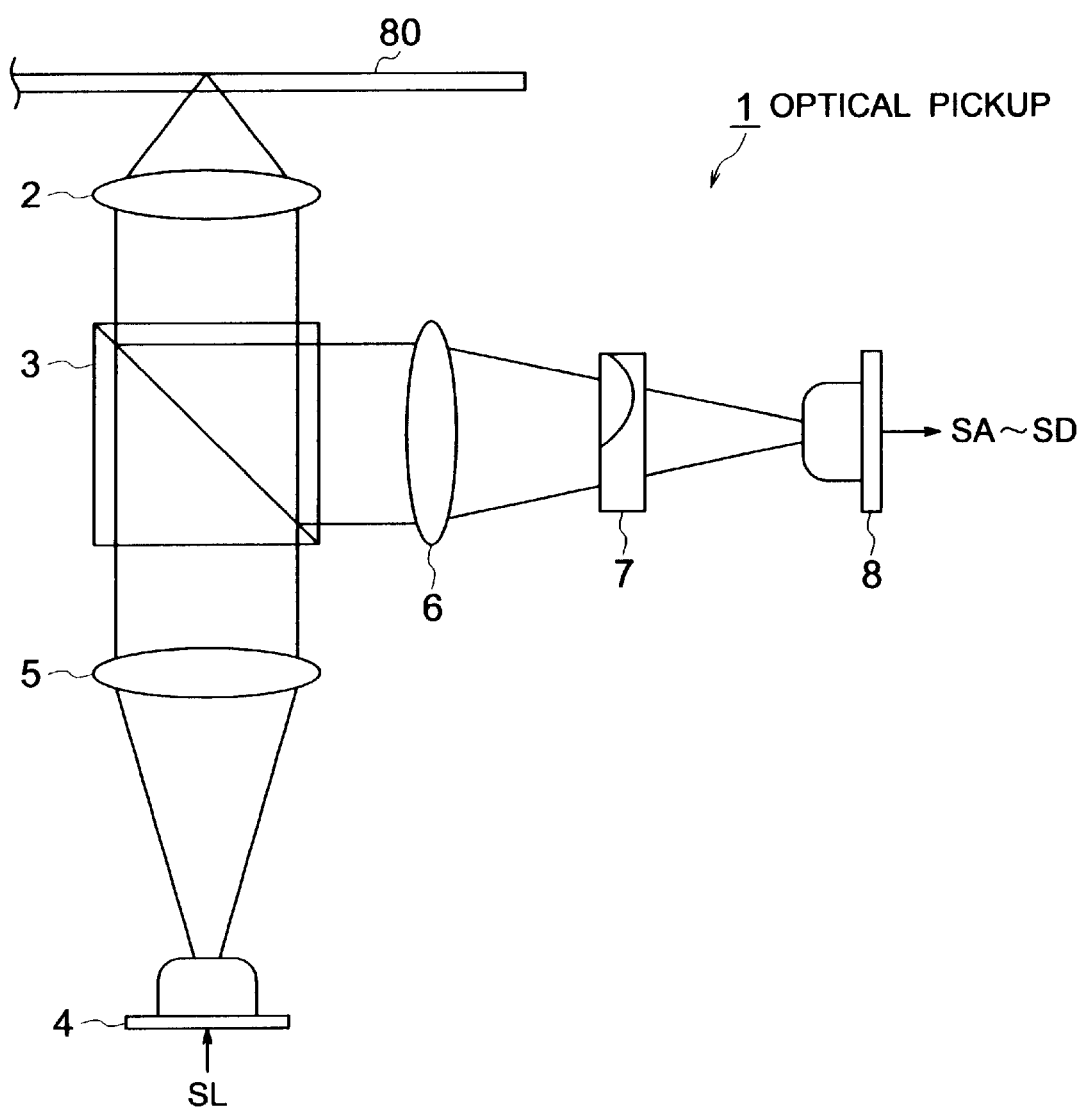
FIG. 1 is a schematic view of the configuration of an optical pickup of the related art.
Figure 2:
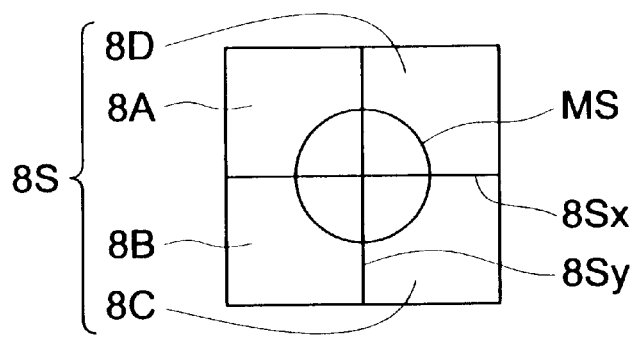
FIG. 2 is an explanatory view of the configuration of a light receiving portion of a photo detector provided in the optical pickup of FIG. 1.
Figure 3:
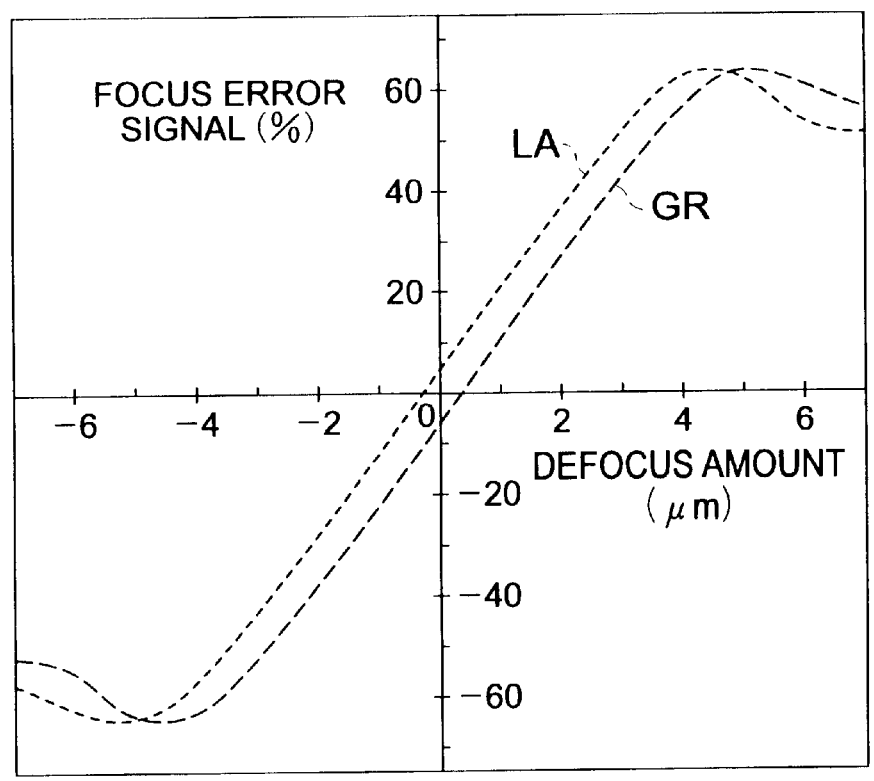
FIG. 3 is a graph of the characteristics of focus error signals with respect to lands and grooves as focus error signals obtained from output signals of the photo detector of the optical pickup of the related art.
Figure 4:
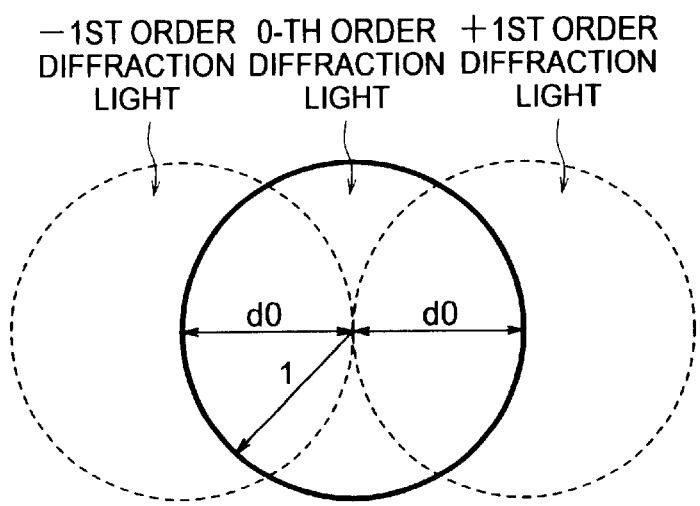
FIG. 4 is an explanatory view of a state of a laser beam supplied from a beam splitter to a focus lens in the optical pickup of FIG. 1.
Figure 5:
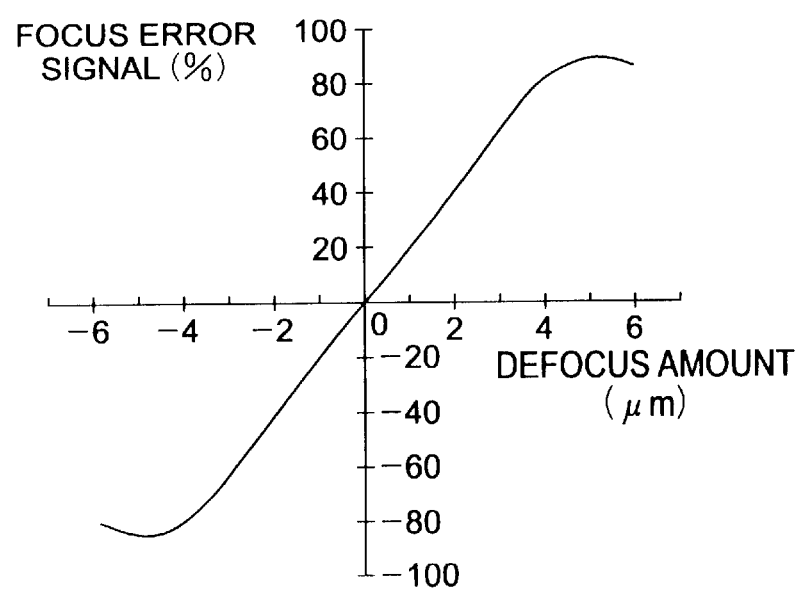
FIG. 5 is a graph of the characteristics of the focus error signal obtained from the output signal of the photo detector of the optical pickup according to the present invention.

The light receiving portion of the photo detector 8 is equally divided to four divided regions by two orthogonal division lines as shown in FIG. 2 described above.

The focus error signal FE in the astigmatism method is given as a difference between a sum (SA+SC) of the output signals of two divided regions located in one diagonal direction among four divided regions divided by the division lines and a sum (SB+SD) of the output signals of two divided regions located in the other diagonal direction as shown in equation (1).

By arranging the polarization plate 9 between the beam splitter 3 and the focus lens 6 or between the beam splitter 3 and the cylindrical lens 7, it is possible to prevent the light intensities at the time of focus from becoming asymmetric with respect to the division lines of the light receiving portion, it is possible to make the focus error signal FE 0 at the time of focus, and thus it is possible to improve a precision of detection of the focus error.

Note that, in the optical pickup 50 of FIG. 6, it is also possible to affix the polarization plate 9 or the polarizer 9A to the emitting surface for emitting the laser beam by the beam splitter 3, possible to form the polarization plate 9 or the polarizer 9A at the emitting surface, or possible to make the transparent substrate 9Z and the beam splitter 3 integrally.

Figure 8:
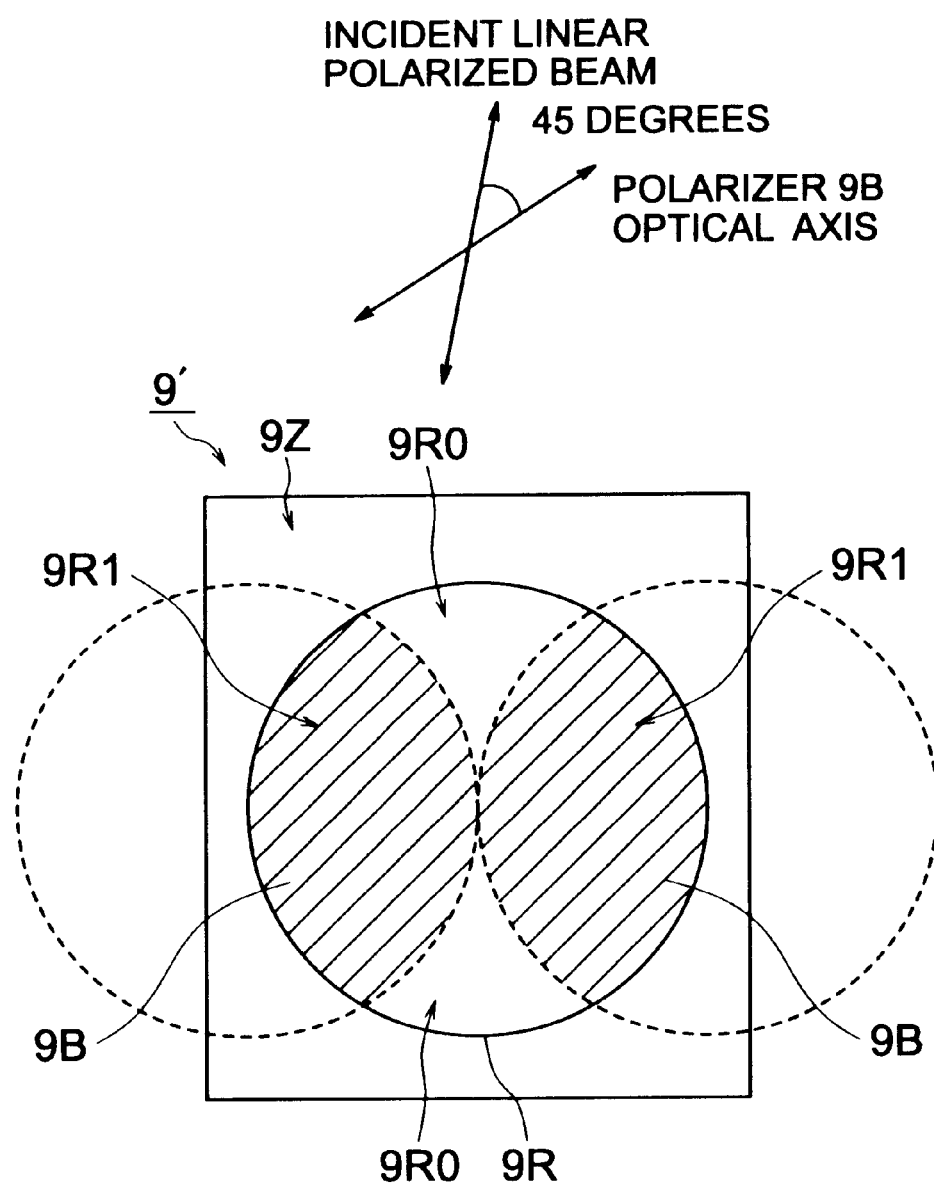
FIG. 8 is a view of the configuration of another example of the polarization plate in the optical pickup of FIG. 6.

FIG. 8 is a view of the configuration of another example of the polarization plate in the optical pickup 50 of FIG. 6. It is also possible to use a polarization plate 9' shown in FIG. 8 as the polarization plate 9 of FIG. 6. Note that, in the polarization plate 9' of FIG. 8, the same references are given to the same components as those of the polarization plate 9 of FIG. 7, and explanations of the same components will be suitably omitted.

This polarization plate 9' has a transparent substrate 9Z and a polarizer 9B. The polarizer 9B is located in the overlapping region 9R1.

As one example, the polarizer 9B is formed by a wavelength plate having an optical axis forming an angle of about 45 degrees or about 135 degrees with respect to the polarization direction of the linear polarized laser beam supplied to the polarization plate 9' and having a phase difference corresponding to $\lambda/2$. The phase difference corresponding to $\lambda/2$ is made for example a phase difference identical or substantially identical to $\{(n-1)\lambda+\lambda/2\}$ where n is a natural number.

By arranging the polarizer 9B in the overlapping region 9R1, the polarization direction of the linear polarized laser beam passed through the overlapping region 9R1 and the polarization direction of the linear polarized laser beam passed through the nonoverlapping region 9R0 can be made orthogonal to each other.

When the laser beam passed through the polarization plate 9' passes through the focus lens 6 and the cylindrical lens 7 and is supplied to the photo detector 8, in the light receiving portion of the photo detector 8, interference between the laser beam passed through the nonoverlapping region 9R0 and the laser beam passed through the overlapping region 9R1 is suppressed, and asymmetry of the light intensities at the time of focus with respect to the division lines of the light receiving portion can be prevented.

By arranging the polarization plate 9' between the beam splitter 3 and the focus lens 6 or between the beam splitter 3 and the cylindrical lens 7, it is possible to prevent the light intensities at the time of focus from becoming asymmetric with respect to the division lines of the light receiving portion, it is possible to make the focus error signal FE 0 at the time of focus, and thus it is possible to improve the precision of detection of the focus error.

Note that, in the optical pickup 50 of FIG. 6, it is possible to affix the polarization plate 9' or the polarizer 9B to the emitting surface for emitting the laser beam by the beam splitter 3 or form the polarization plate 9' or the polarizer 9B at the emitting surface.

Figure 9:
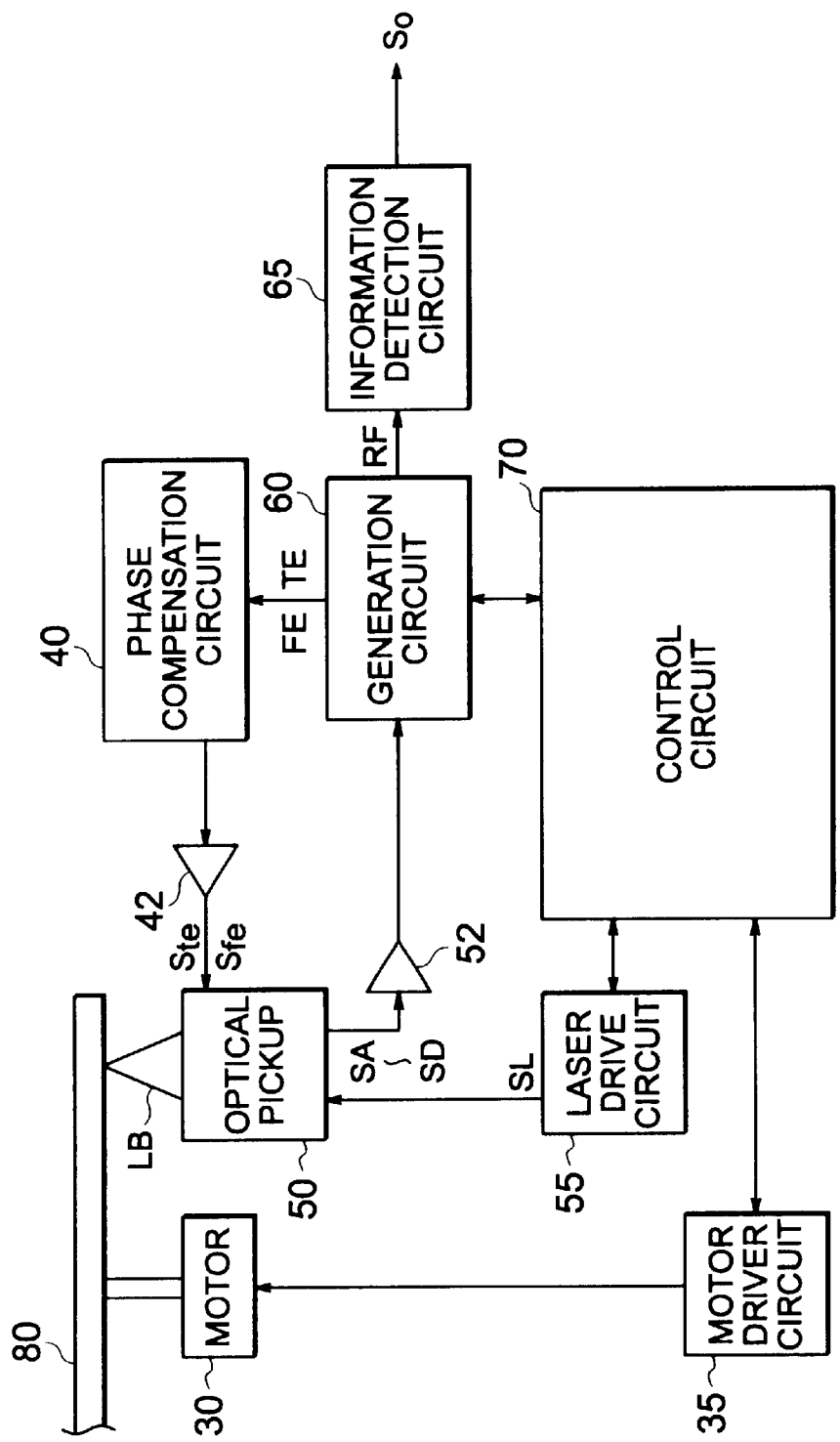
FIG. 9 is a schematic block diagram of the configuration of an embodiment of a recording and/or reproducing apparatus having the optical pickup 50 of FIG. 6.

FIG. 9 is a schematic block diagram of the configuration of a recording and/or reproducing apparatus having the optical pickup 50 of an embodiment shown in FIG. 6.

This recording and/or reproducing apparatus 90 has a motor 30, a motor drive circuit 35, a phase compensation circuit 40, an amplifier circuit 42, an optical pickup 50, an amplifier circuit (head amplifier) 52, a laser drive circuit 55, a generation circuit 60, an information detection circuit (detection circuit) 65, and a control circuit 70. This recording and/or reproducing apparatus 90 reproduces the recorded information recorded on the optical disk 80.

The control circuit 70 is a controller for the overall control of the recording and/or reproducing apparatus 90 and is configured by for example a microcomputer.

This control circuit 70 controls the motor 30, motor drive circuit 35, laser drive circuit 55, optical pickup 50, phase compensation circuit 40, generation circuit 60, information detection circuit 65, etc.

The optical pickup 50 focuses a laser beam LB on the reproduction portion of the optical disk 80 at the time of reproduction.

The laser drive circuit 55 generates a drive signal SL under the control of the control circuit 70 and drives the semiconductor laser 4 in the optical pickup 50 by this drive signal SL to make the semiconductor laser 4 output the laser beam LB therefrom.

The motor 30 is configured by for example a spindle motor and rotates the optical disk 80 at a predetermined rotation speed. This motor 30 rotates the optical disk 80 so that the linear speed becomes constant as one example.

The motor drive circuit 35 supplies a drive power to the motor 30 to drive the motor 30. The motor drive circuit 35 can control the rotation of the motor 30 by pulse width modulation (PWM) control or can control the rotation by phase locked loop (PLL) control.

The amplifier circuit 52 amplifies the output signals SA to SD of the light receiving portion of the photo detector 8 provided in the optical pickup 50 and supplies the same to the generation circuit 60.

The generation circuit 60 generates a reproduction signal RF, a focus error signal FE, and a tracking error signal TE based on the amplified output signals SA to SD from the amplifier circuit 52.

This generation circuit 60 for example generates the reproduction signal RF based on a sum (SA+SB+SC+SD) of the output signals SA to SD from the amplifier circuit 52. Further, it generates the tracking error signal TE based on the difference of sums of the output signals of adjoining two divided regions among the output signals SA to SD from the amplifier circuit 52.

The phase compensation circuit 40 compensates the phase (phase compensation and/or frequency compensation) of the focus error signal FE and the tracking error signal TE to generate compensated signals and supplies the compensated signals to the amplifier circuit 42.

The amplifier circuit 42 supplies the drive signal amplified from the compensated signal of the focus error signal FE (that is, the signal obtained by compensating and amplifying the focus error signal FE) Sfe to the focusing actuator 2F in the optical pickup 50.

Further, the amplifier circuit 42 supplies the drive signal amplified from the compensated signal of the tracking error signal TE (that is, the signal obtained by compensating and amplifying the tracking error signal TE) Ste to the tracking actuator 2T in the optical pickup 50.

The information detection circuit 65 is supplied with the reproduction signal RF from the generation circuit 60, demodulates etc. the reproduction signal RF to reproduce the recorded information of the optical disk 80, and outputs the reproduced recorded information as the output signal So.

The recording and/or reproducing apparatus 90 has the optical pickup 50 having a high detection precision of focus error, therefore it is possible to raise the reliability of the reproduced information.

Second Embodiment

Figure 10:
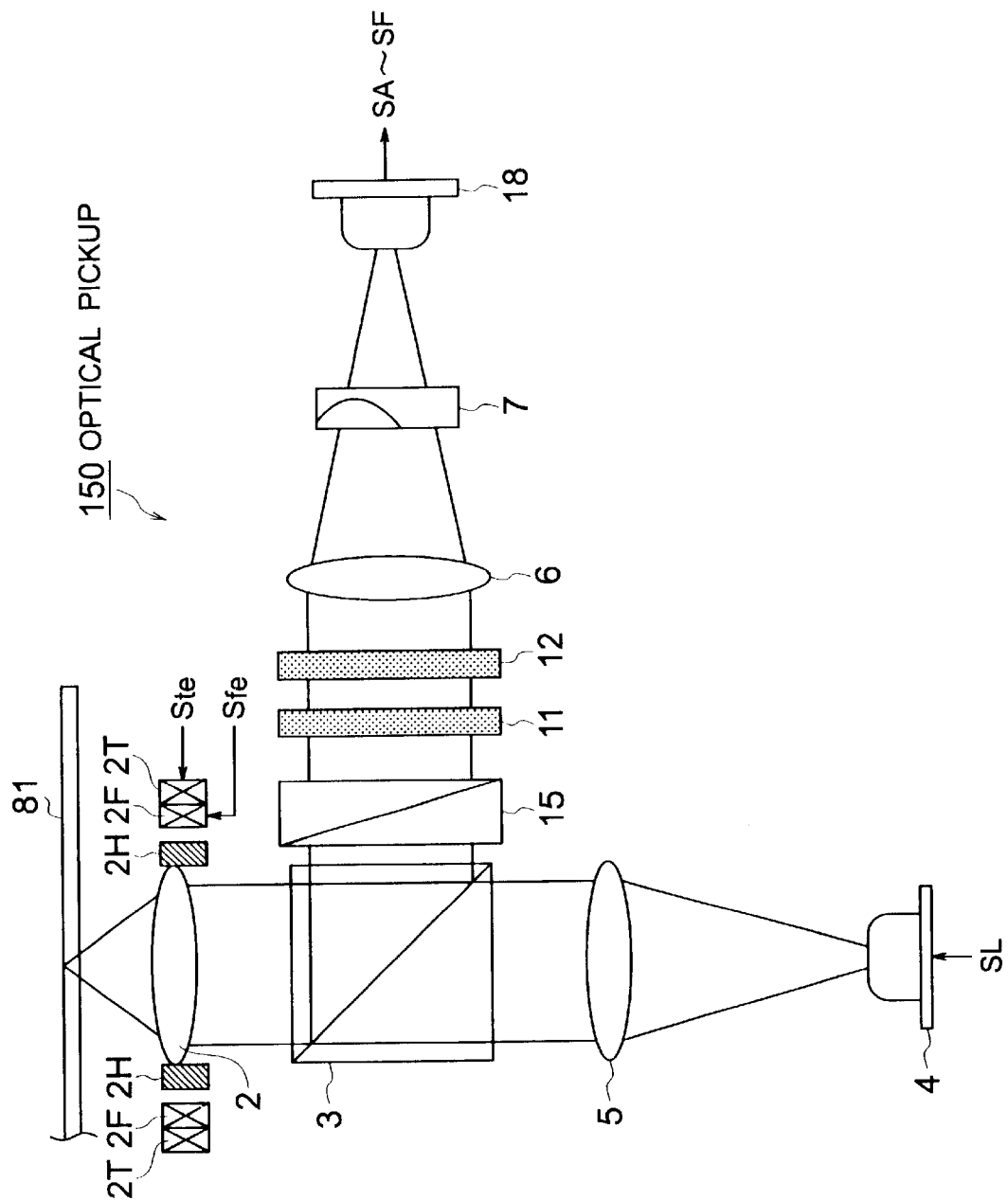
FIG. 10 is a schematic view of the configuration of a second embodiment of the optical pickup according to the present invention.

FIG. 10 is a schematic view of the configuration of an optical pickup according to a second embodiment of the present invention.

This optical pickup 150 has a semiconductor laser 4, a collimator lens 5, a beam splitter 3, an objective lens 2, a focus lens 6, a cylindrical lens 7, a photo detector 18, a lens holder 2H, a focusing actuator 2F, a tracking actuator 2T, a first polarization plate 11, a second polarization plate 12, and a Wollaston polarizing prism 15.

The objective lens 2 is held at the lens holder 2H.

The focusing actuator 2F moves the lens holder 2H in the focus direction vertical to the recording surface of the optical disk 81 based on the drive signal Sfe and, as a result, moves the objective lens 2 in the focus direction.

The tracking actuator 2T moves the lens holder 2H in the radius direction or the tracking direction of the optical disk 81 based on the drive signal Ste and, as a result, moves the objective lens 2 in the radius direction or the tracking direction of the optical disk 81.

The semiconductor laser 4 outputs the linear polarized laser beam based on the drive signal SL and supplies the same to the collimator lens 5.

The collimator lens 5 changes the laser beam from the semiconductor laser 4 to a parallel beam and supplies the same to the beam splitter 3.

The beam splitter 3 passes the laser beam from the collimator lens 5 therethrough and supplies the same to the objective lens 2.

The objective lens 2 condenses the laser beam from the beam splitter 3 and supplies the same to a track of the optical disk 81 having lands and/or grooves. This optical disk 81 is made by for example a magneto-optical disk.

Further, the objective lens 2 returns the laser beam reflected at the optical disk 81 to the beam splitter 3.

The beam splitter 3 is struck by the laser beam from the objective lens 2 and reflects and emits the incident laser beam to supply it to the Wollaston polarizing prism 15.

The Wollaston polarizing prism 15 separates the laser beam from the beam splitter 3 to a main laser beam and first and second sub laser beams and supplies the same via the first and second polarization plates 11 and 12 to the focus lens 6.

The focus lens 6 focuses the laser beam passed through the polarization plates 11 and 12 and supplies the same to the cylindrical lens 7.

The cylindrical lens 7 passes the laser beam from the focus lens 6 therethrough and supplies the same to the photo detector 18.

The photo detector 18 receives the laser beam from the cylindrical lens 7 at its light receiving portion and generates the output signals SA to SF.

FIG. 11 is an explanatory view of the configuration of the light receiving portion of the photo detector 18. The light receiving portion of the photo detector 18 has a main light receiving portion 18S, a first sub light receiving portion 18E, and a second sub light receiving portion 18F.

The main light receiving portion 18S is supplied with the main laser beam separated at the Wollaston polarizing prism 15 via the polarization plates 11 and 12, focus lens 6, and the cylindrical lens 7. The main light receiving portion 18S is equally divided to four by two division lines 18Sx and 18Sy and has four divided regions 18A to 18D. In the main light receiving portion 18S of FIG. 11, the beam spot MS is formed by the main laser beam from the cylindrical lens 7.

The direction of the generatrix of the cylindrical lens 7 forms an angle of about 45 degrees or about 135 degrees with respect to the direction of the division line 18Sx or the division line 18Sy of the main light receiving portion 18S.

The intersecting point of the division lines 18Sx and 18Sy is located at the center or substantially at the center of the main laser beam passed through the cylindrical lens 7.

The shape of the beam spot MS formed in the main light receiving portion 18S varies in the diagonal direction in accordance with the distance between the optical disk 81 and the objective lens 2, so the focus deviation can be detected at the optical disk 81 by the astigmatism method based on the output signals SA to SD generated by the divided regions 18A to 18D.

The first sub light receiving portion 18E is supplied with the first sub laser beam separated at the Wollaston polarizing prism 15 via the polarization plates 11 and 12, focus lens 6, and the cylindrical lens 7 and generates an output signal SE. In the first sub light receiving portion 18E of FIG. 11, a beam spot SSE is formed by the first sub laser beam from the cylindrical lens 7.

The second sub light receiving portion 18F is supplied with the second sub laser beam separated at the Wollaston polarizing prism 15 via the polarization plates 11 and 12, focus lens 6, and the cylindrical lens 7 and generates an output signal SF. In the second sub light receiving portion 18F of FIG. 11, a beam spot SSF is formed by the second sub laser beam from the cylindrical lens 7.

Figure 12:
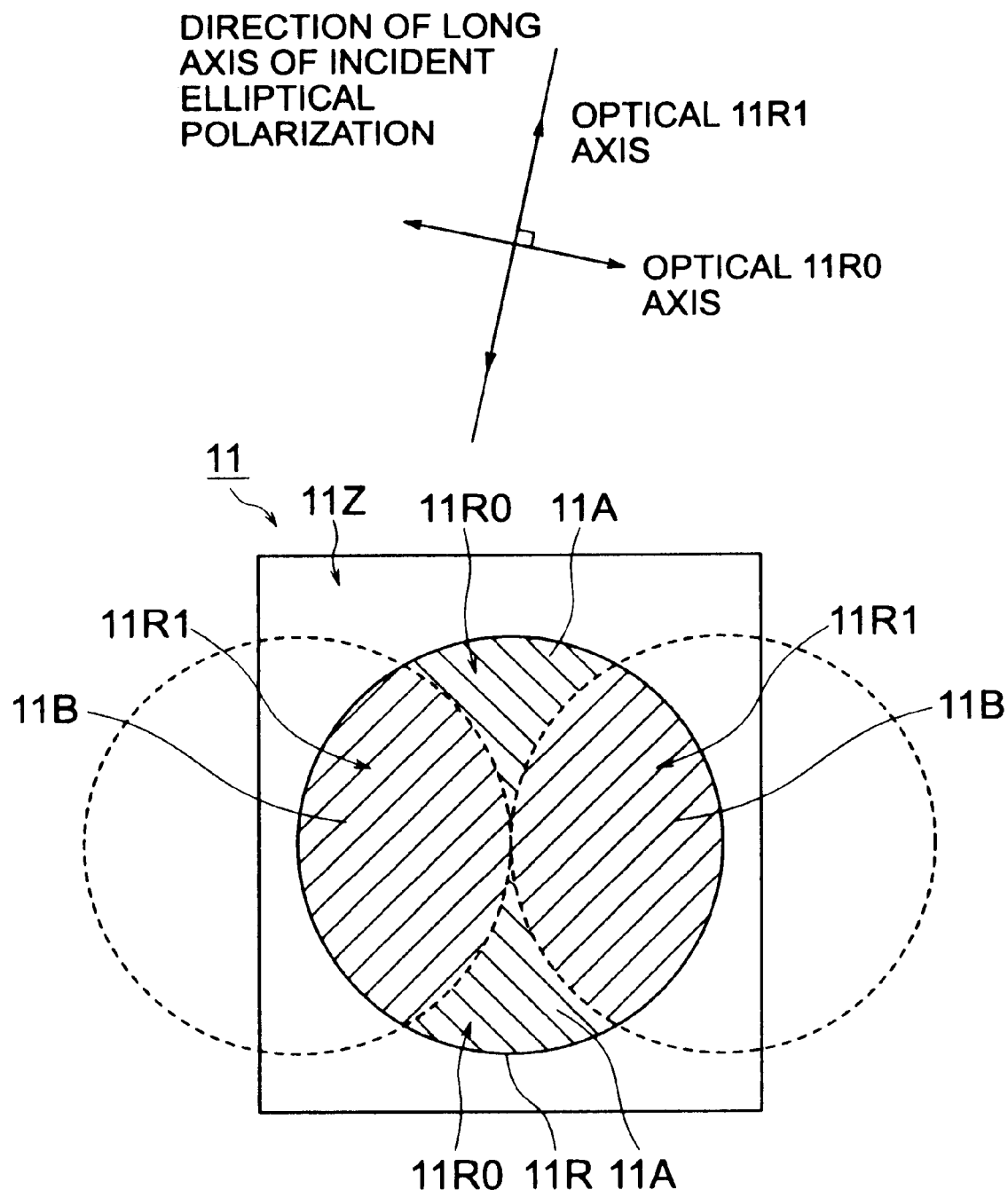
FIG. 12 is a view of the configuration of an example of a first polarization plate 11 in an optical pickup 150 of FIG. 10.

FIG. 12 is a view of the configuration of an example of the first polarization plate 11 in the optical pickup 150 of FIG. 10.

The laser beam reflected at the optical disk 81 contains a 0-th order diffraction light reflected at the track and a +1st order diffraction light generated due to the diffraction of the light by the lands and/or grooves.

The first polarization plate 11 is supplied with the laser beams containing the 0-th order diffraction light and the +1st order diffraction light from the Wollaston polarizing prism 15 and changes the polarization direction of the main laser beam among the laser beams from the Wollaston polarizing prism 15. Note that, the main laser beam from the Wollaston polarizing prism 15 becomes an elliptical polarized beam having a long axis orientation determined according to the optical axis of the Wollaston polarizing prism 15.

This first polarization plate 11 has a transparent substrate 11Z and polarizers 11A and 11B.

The transparent substrate 11Z has an overlapping region 11R1 in which the 0-th order diffraction light and the +1st order diffraction light contained in the main laser beam overlap and a nonoverlapping region 11R0 in which they do not overlap inside a contour 11R. The 0-th order diffraction light is supplied to the nonoverlapping region 11R0, and the 0-th order diffraction light and the +1st order diffraction light are supplied to the overlapping region 11R1.

The polarizer 11A is located in the nonoverlapping region 11R0 of the transparent substrate 11Z and, as one example, is comprised by a wavelength plate with an optical axis vertical to the long axis direction and having a phase difference corresponding to $\lambda/4$.

The polarizer 11B is located in the overlapping region 11R1 of the transparent substrate 11Z and, as one example, is comprised by a wavelength plate with an optical axis parallel to the long axis direction and having a phase difference corresponding to $\lambda/4$. The phase difference corresponding to $\lambda/4$ possessed by the polarizers 11A and 11B is made a phase difference identical or substantially identical to $\{(m-1)\times\lambda/2+\lambda/4\}$ where for example m is a natural number.

Note that, the phase difference characteristics corresponding to the nonoverlapping region 11R0 and the overlapping region 11R1 can be reversed. It is possible if their optical axes are replaced by each other. Specifically, it is possible to give a polarizer 11A of the region 11R0 an optical axis parallel to the direction of the long axis of the ellipse and, at the same time, give a polarizer 11B of the region 11R1 an optical axis vertical to the direction of the long axis of the ellipse.

Figure 13:
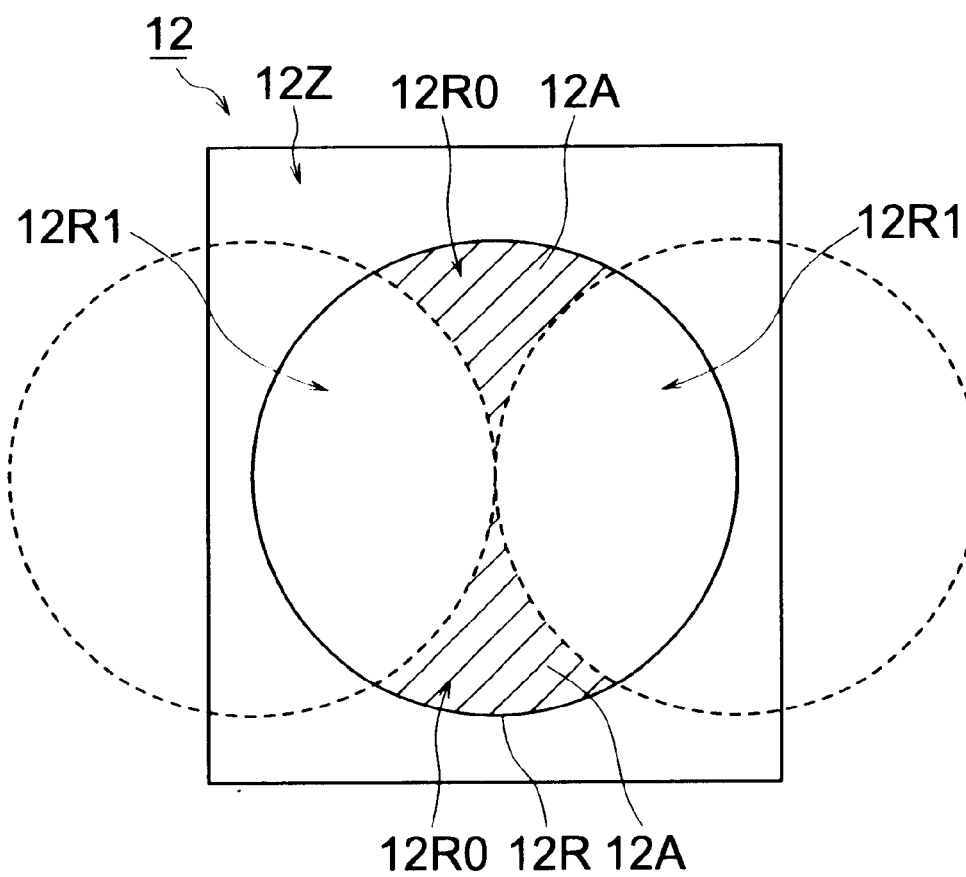
FIG. 13 is a view of the configuration of an example of a second polarization plate 12 in the optical pickup 150 of FIG. 10.

FIG. 13 is a view of the configuration of an example of the second polarization plate 12 in the optical pickup 150 of FIG. 10.

The second polarization plate 12 is supplied with the main laser beam containing the 0-th order diffraction light and the +1st order diffraction light and passed through the first polarization plate 11.

This second polarization plate 12 has a transparent substrate 12Z and a polarizer 12A.

The transparent substrate 12Z has an overlapping region 12R1 in which the 0-th order diffraction light and the +1st order diffraction light overlap and a nonoverlapping region 12R0 in which they do not overlap inside a contour 12R. The 0-th order diffraction light is supplied to the nonoverlapping region 12R0, and the 0-th order diffraction light and the +1st order diffraction light are supplied to the overlapping region 12R1. The polarizer 12A is located in the nonoverlapping region 12R0 of the transparent substrate 12Z.

The polarizer 12A is made by, as one example, a wavelength plate having the optical axis forming an angle of about 45 degrees or about 135 degrees with respect to the long axis orientation and having a phase difference corresponding to $\lambda/2$. The phase difference corresponding to $\lambda/2$ is made a phase difference identical or substantially identical to $\{(n-1)\lambda+\lambda/2\}$ where for example n is a natural number.

By arranging the polarizer 12A in the nonoverlapping region 12R0, the polarization direction of the linear polarized laser beam passed through the nonoverlapping region 12R0 and the polarization direction of the linear polarized laser beam passed through the overlapping region 12R1 can be made orthogonal to each other.

When the laser beam passed through the polarization plates 11 and 12 passes through the focus lens 6 and the cylindrical lens 7 and is supplied to the photo detector 18, in the main light receiving portion 18S of the photo detector 18, interference between the laser beam passed through the nonoverlapping region 12R0 and the laser beam passed through the overlapping region 12R1 is suppressed, and asymmetry of the light intensities at the time of focus with respect to the division lines of the main light receiving portion 18S can be prevented.

By arranging the first and second polarization plates 11 and 12 between the Wollaston polarizing prism 15 and the focus lens 6 or between the Wollaston polarizing prism 15 and the cylindrical lens 7, it is possible to prevent the light intensities at the time of focus from becoming asymmetric with respect to the division lines 18Sx and 18Sy of the main light receiving portion 18S, it is possible to make the focus error signal FE 0 at the time of focus, and it is possible to improve the precision of detection of the focus error.

Note that, in the optical pickup 150 of FIG. 10, it is possible to affix the first and second polarization plates 11 and 12 to the emitting surface for emitting the main laser beam by the Wollaston polarizing prism 15, possible to form the first and second polarization plates 11 and 12 at the emitting surface, or integrally form the Wollaston polarizing prism 15 and the transparent substrates 11Z and 12Z. It is also possible to bond the first and second polarization plates 11 and 12 to joint them together. Further, it is possible to switch the positions of the first and second polarization plates 11 and 12.

Further, in the polarization plate 12 of FIG. 13, the case where the polarizer 12A was arranged in the nonoverlapping region 12R0 was exemplified, but it is also possible to arrange a polarizer having similar characteristics to those of the polarizer 12A in the overlapping region 12R1 of the transparent substrate 12Z in place of this.

Figure 14:
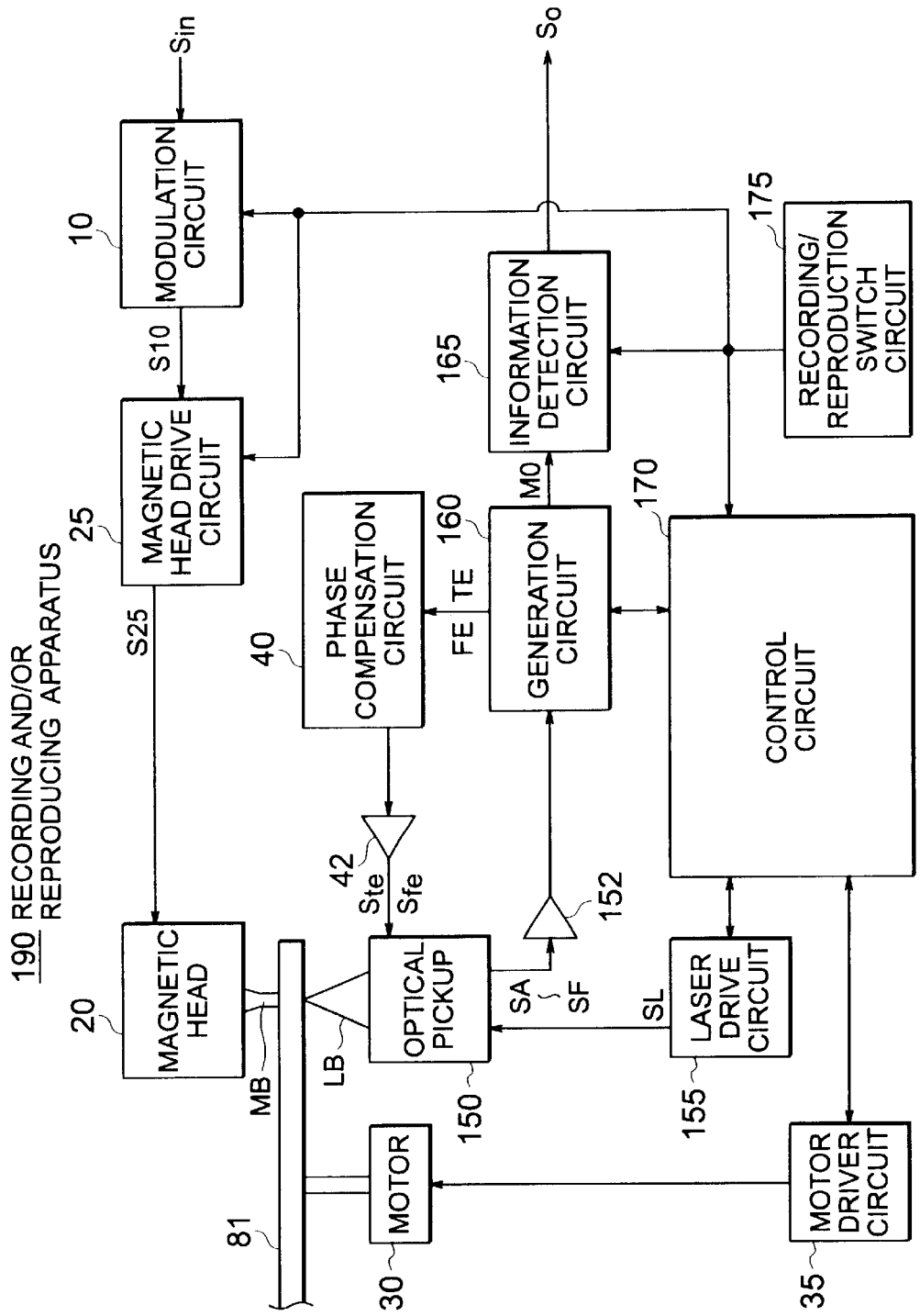
FIG. 14 is a schematic block diagram of the configuration of an embodiment of the recording and/or reproducing apparatus having the optical pickup 150 of FIG. 10.

FIG. 14 is a schematic block diagram of the configuration of a recording and/or reproducing apparatus having the optical pickup 150 of an embodiment shown In FIG. 10.

This recording and/or reproducing apparatus 190 has a modulation circuit 10, a magnetic head 20, a magnetic head drive circuit 25, a motor 30, a motor drive circuit 35, a phase compensation circuit 40, an amplifier circuit 42, an optical pickup 150, an amplifier circuit (head amplifier) 152, a laser drive circuit 155, a generation circuit 160, an information detection circuit (detection circuit) 165, a control circuit 170, and a recording/reproduction switch circuit 175.

This recording and/or reproducing apparatus 190 records Information on the rotating optical disk 81 or reproduces the recorded information from the rotating optical disk 81.

The control circuit 170 is a controller for overall control of the recording and/or reproducing apparatus 190 and Is configured by for example a microcomputer.

This control circuit 170 controls the motor drive circuit 35, laser drive circuit 155, optical pickup 150, phase compensation circuit 40, generation circuit 160, information detection circuit 165, magnetic head drive circuit 25, and the modulation circuit 10, etc.

The optical pickup 150 focuses the laser beam LB on the recording portion of the optical disk 81 at the time of recording and focuses the laser beam LB on the reproduction portion of the optical disk 81 at the time of reproduction. Note, the power of the laser beam LB is larger at the time of recording than at the time of reproduction.

The modulation circuit 10 receives as input an input signal Sin indicating the information to be recorded at the time of recording. It modulates this input signal Sin by an eight-to-14 modulation (EFM) method or the like to generate an output signal S10 and supplies this output signal S10 to the magnetic head drive circuit 25.

The magnetic head drive circuit 25 supplies an energization current S25 for drive to the magnetic head 20 based on the output signal S10 of the modulation circuit 10.

The magnetic head 20 is energized in its core by the energization current S25 from the magnetic head drive circuit 25, generates a magnetic beam MB in accordance with the input signal Sin from the core, and applies a magnetic field in accordance with the input signal Sin to the beam irradiated position of the optical disk 81.

The motor 30 is constituted by for example a spindle motor and rotates the optical disk 81 at a predetermined rotation speed. This motor 30 rotates the optical disk 81 so that the linear speed becomes constant as an example.

The motor drive circuit 35 supplies a drive power to the motor 30 to drive the motor 30. This motor drive circuit 35 may control the rotation of the motor 30 by PWM control or control the rotation by PLL control.

The laser drive circuit 155 generates the drive signal SL under the control of the control circuit 170 and drives the semiconductor laser 4 in the optical pickup 150 by this drive signal SL to make the semiconductor laser 4 output the laser beam LB. The laser drive circuit 155 makes the output power of the laser beam LB at the time of recording larger than that at the time of reproduction.

The optical pickup 150 supplies the laser beam LB to a track of the optical disk 81 to focus the beam on the recording portion or the reproduction portion of the optical disk 81.

At the time of recording, the position of the optical disk 81 focused on rises to a high temperature that exceeds the Curie point of the recording film, the position focused on is magnetized by the magnetic field applied from the magnetic head 20, and thus the input signal Sin is recorded.

The amplifier circuit (head amplifier) 152 amplifies the output signals SA to SF of the photo detector 18 in the optical pickup 150 and supplies the same to the generation circuit 160.

The generation circuit 160 generates a reproduction signal MO, a focus error signal FE, and a tracking error signal TE based on the amplified output signals SA to SF from the amplifier circuit 152.

This generation circuit 160 for example generates the reproduction signal MO as a magneto-optical signal based on the difference (SE–SF) between the output signals SE and SF from the amplifier circuit 152. Further, it generates the tracking error signal TE based on the difference between the sums of the output signals of two adjoining divided regions among the output signals SA to SF from the amplifier circuit 152.

The phase compensation circuit 40 compensates (phase compensation and/or frequency compensation) the focus error signal FE and the tracking error signal TE to generate compensated signals and supplies the compensated signals to the amplifier circuit 42.

The amplifier circuit 42 supplies the drive signal Sfe amplified from the compensated signal of the focus error signal FE to the focusing actuator 2F in the optical pickup 150. Further, the amplifier circuit 42 supplies the drive signal Ste amplified from the compensated signal of the tracking error signal TE to the tracking actuator 2T in the optical pickup 150.

The information detection circuit 165 is supplied with the reproduction signal MO from the generation circuit 160 demodulates etc. the reproduction signal MO to reproduce the recorded information of the optical disk 81, and outputs the reproduced recorded information as the output signal So.

The recording/reproduction switch circuit 175 generates a switch signal for switching the recording and the reproduction of the recording and/or reproducing apparatus 190 and supplies this switch signal to the control circuit 170, information detection circuit 165, modulation circuit 10, magnetic head drive circuit 25, etc.

The modulation circuit 10 stops the supply of the output signal S10 to the magnetic head drive circuit 25 when the switch signal indicating reproduction is supplied. Further, the magnetic head drive circuit 25 stops the supply of the energlzation current S25 to the magnetic head 20 when the switch signal indicating reproduction is supplied.

On the other hand, the information detection circuit 165 stops the generation of the output signal So when the switch signal indicating recording is supplied. Further, the control circuit 170 controls the laser output power of the optical pickup 150 in accordance with the switch signal.

Since the recording and/or reproducing apparatus 190 has an optical pickup 150 having a high precision of detection of focus error, it is possible to enhance the reliability of the reproduced information.

Third Embodiment

Figure 15:
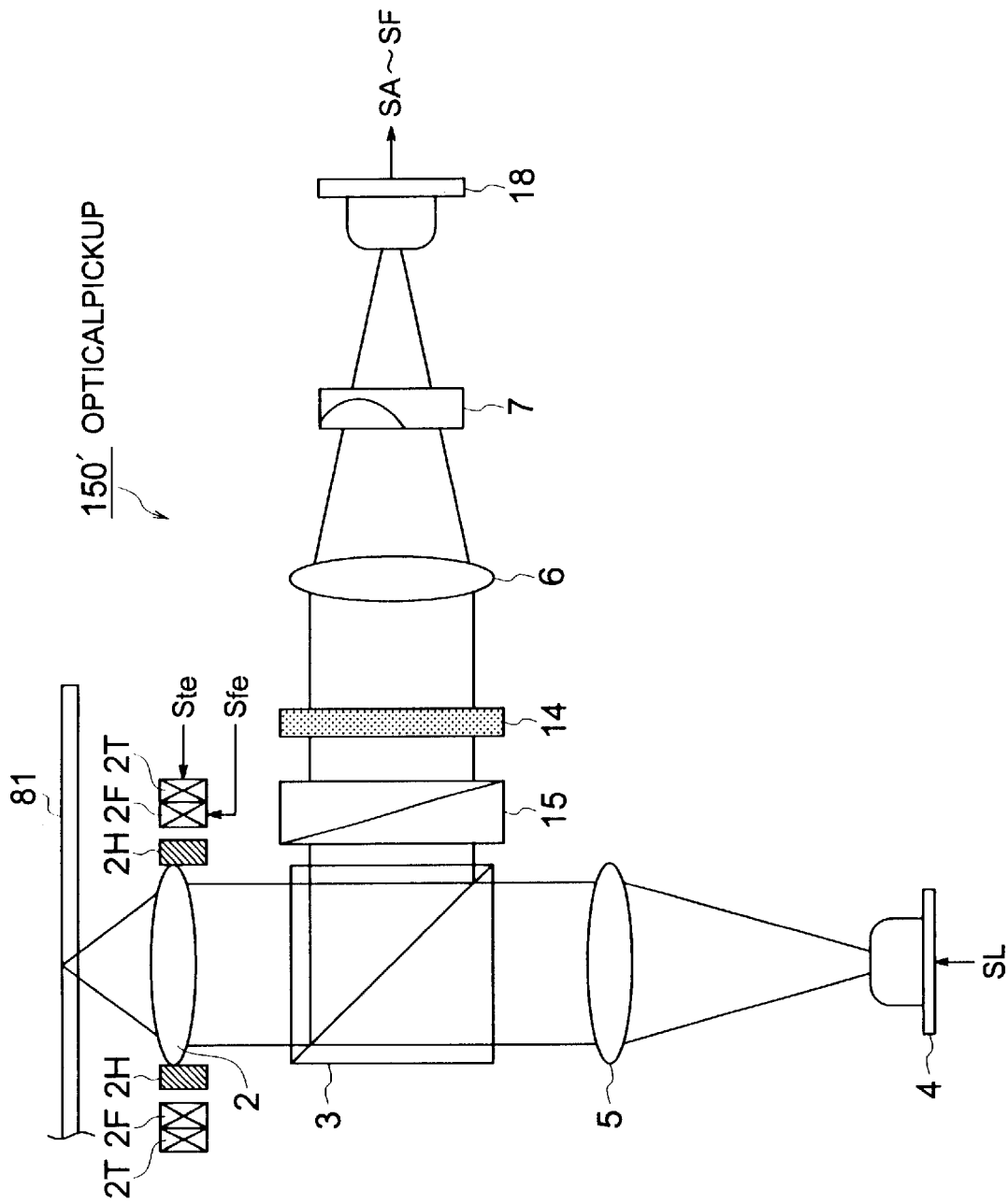
FIG. 15 is a schematic view of the configuration of a third embodiment of the optical pickup according to the present invention.

FIG. 15 is a schematic view of the configuration of an optical pickup according to a third embodiment according to the present invention.

This optical pickup 150' is configured arranging a substrate 14 in place of the first and second polarizers 11 and 12 in the optical pickup 150 of FIG. 10. In FIG. 10 and FIG. 15, the same references are assigned to the same components, and explanations of the same components will be suitably omitted. Note that, in the recording and/or reproducing apparatus 190, it is also possible to use the optical pickup 150' shown in FIG. 15 in place of the optical pickup 150 of FIG. 10.

In the optical pickup 150' of FIG. 15, the Wollaston polarizing prism 15 separates the laser beam from the beam splitter 3 to the main laser beam and the first and second sub laser beams and supplies the same via the substrate 14 to the focus lens 6.

The focus lens 6 focuses the laser beams passed through the substrate 14 and supplies the same to the cylindrical lens 7.

The photo detector 18 receives the laser beams from the cylindrical lens 7 at its light receiving portion 18S and generates the output signals SA to SF.

Figure 16:
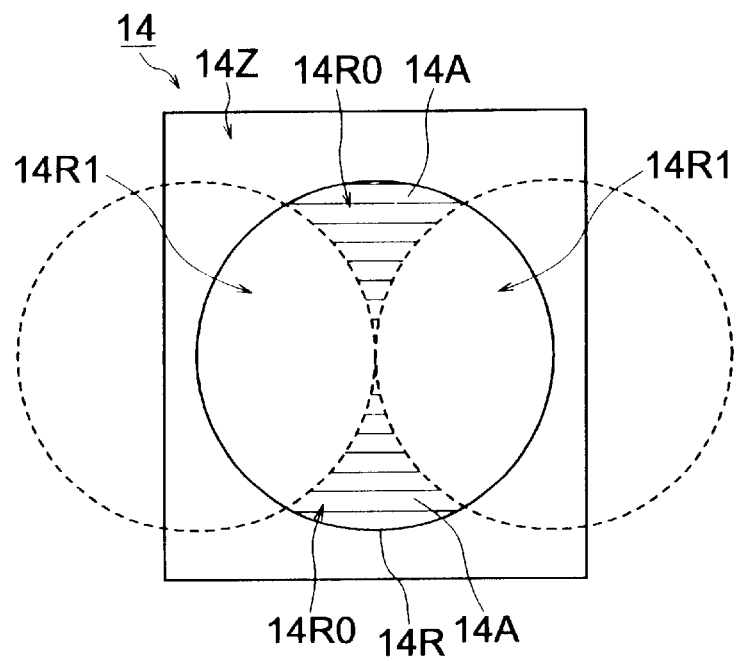
FIG. 16 is a view of the configuration of an example of a substrate in an optical pickup 150' of FIG. 15.

FIG. 16 is a view of the configuration showing an example of the substrate 14 in the optical pickup 150' of FIG. 15.

The laser beams reflected at the optical disk 81 contain the 0-th order diffraction light reflected at the track and the +1st order diffraction light generated by the diffraction of the light by the land and/or groove.

The substrate 14 is supplied with the laser beams containing the 0-th order diffraction light and the +1st order diffraction light from the Wollaston polarizing prism 15 and blocks a predetermined portion of the main laser beam among the laser beams from the Wollaston polarizing prism 15.

This substrate 14 has a transparent substrate 14Z. A light shield region 14A is provided in the transparent substrate 14Z.

The transparent substrate 14Z has an overlapping region 14R1 in which the 0-th order diffraction light and the +1st order diffraction light contained in the main laser beam overlap and a nonoverlapping region 14R0 in which they do not overlap in a contour 14R. The 0-th order diffraction light is supplied to the nonoverlapping region 14R0, and the 0-th order diffraction light and the +1st order diffraction light are supplied to the overlapping region 14R1.

The light shield region 14A is provided so as to coincide with the nonoverlapping region 14R0 of the transparent substrate 14Z.

By configuring the nonoverlapping region 14R0 as the light shield region 14A, the 0-th order diffraction light supplied to the nonoverlapping region 14R0 is blocked, and the laser beam passed through the overlapping region 14R1 can be supplied to the photo detector 18.

Where the laser beam passed through the substrate 14 passes through the focus lens 6 and the cylindrical lens 7 and is supplied to the photo detector 18, at the light receiving portion 18S of the photo detector 18, interference of the laser beams passed through the overlapping region 14R1 is eliminated, so it is possible to prevent the light intensities at the time of focus from becoming asymmetric with respect to the division lines 18Sx and 18Sy of the light receiving portion 18S, thus it is possible to improve the precision of detection of the focus error.

Note that, in the optical pickup 150' of FIG. 10, it is possible to affix the substrate 14 to the emitting surface for emitting the main laser beam by the Wollaston polarizing prism 15, possible to form the substrate 14 or the light shield region 14A at the emitting surface or the Wollaston polarizing prism 15, and possible to integrally form the transparent substrate 14Z.

Figure 17:
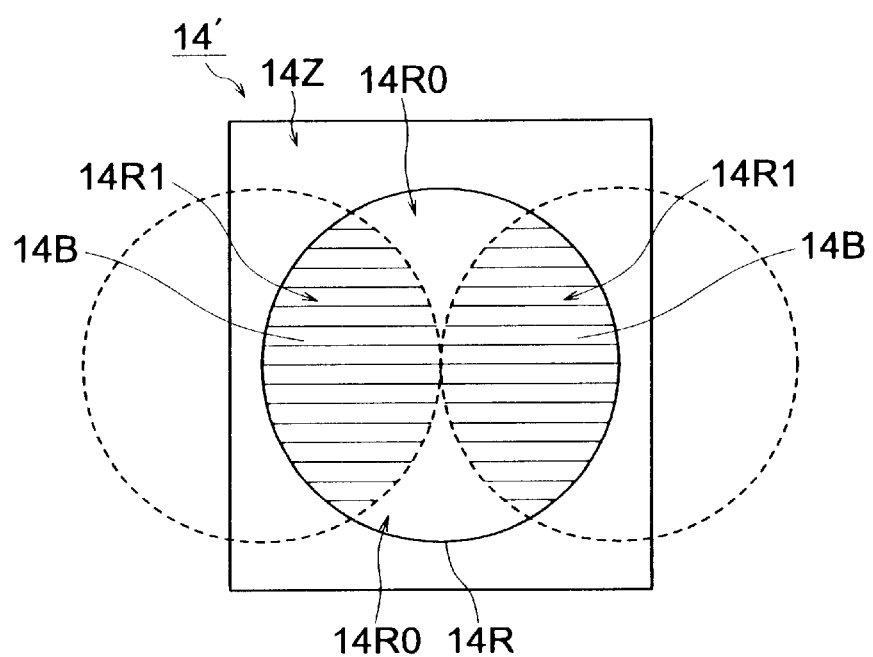
FIG. 17 is a view of the configuration of another example of the substrate in the optical pickup 150' of FIG. 15.

As the substrate 14 in the optical pickup 150' of FIG. 15, it is also possible to use a substrate 14' shown in FIG. 17. Note that, the same references are attached to the same components in FIG. 16 and FIG. 17, and the explanation of the same components will be suitably omitted.

The substrate 14' is supplied with the laser beams containing the 0-th order diffraction light and the +1st order diffraction light from the Wollaston polarizing prism 15 and blocks the predetermined portion of the main laser beam among the laser beams from the Wollaston polarizing prism 15.

This substrate 14' has the transparent substrate 14Z, and a light shield region 14B is provided in the transparent substrate 14Z. The light shield region 14B is provided so as to coincide with the overlapping region 14R1 of the transparent substrate 14Z.

By configuring the overlapping region 14R1 by the light shield region 14B, the 0-th order diffraction light and the +1st order diffraction light supplied to the overlapping region 14R1 are blocked, and the laser beam passed through the nonoverlapping region 14R0 can be supplied to the photo detector 18.

Where the laser beam passed through the substrate 14' passes through the focus lens 6 and the cylindrical lens 7 and is supplied to the photo detector 18, at the light receiving portion 18S of the photo detector 18, the interference of the laser beams passed through the nonoverlapping region 14R0 is eliminated, so it is possible to prevent the light intensities at the time of focus from becoming asymmetric with respect to the division lines 18Sx and 18Sy of the light receiving portion 18S, thus it is possible to improve the precision of detection of the focus error.

Note that, in the optical pickup 150' of FIG. 10, it is possible to affix the substrate 14' to the emitting surface for emitting the main laser beam by the Wollaston polarizing prism 15 and possible to form the substrate 14' or the light shield region 14B at the emitting surface.

Fourth Embodiment

Figure 18:
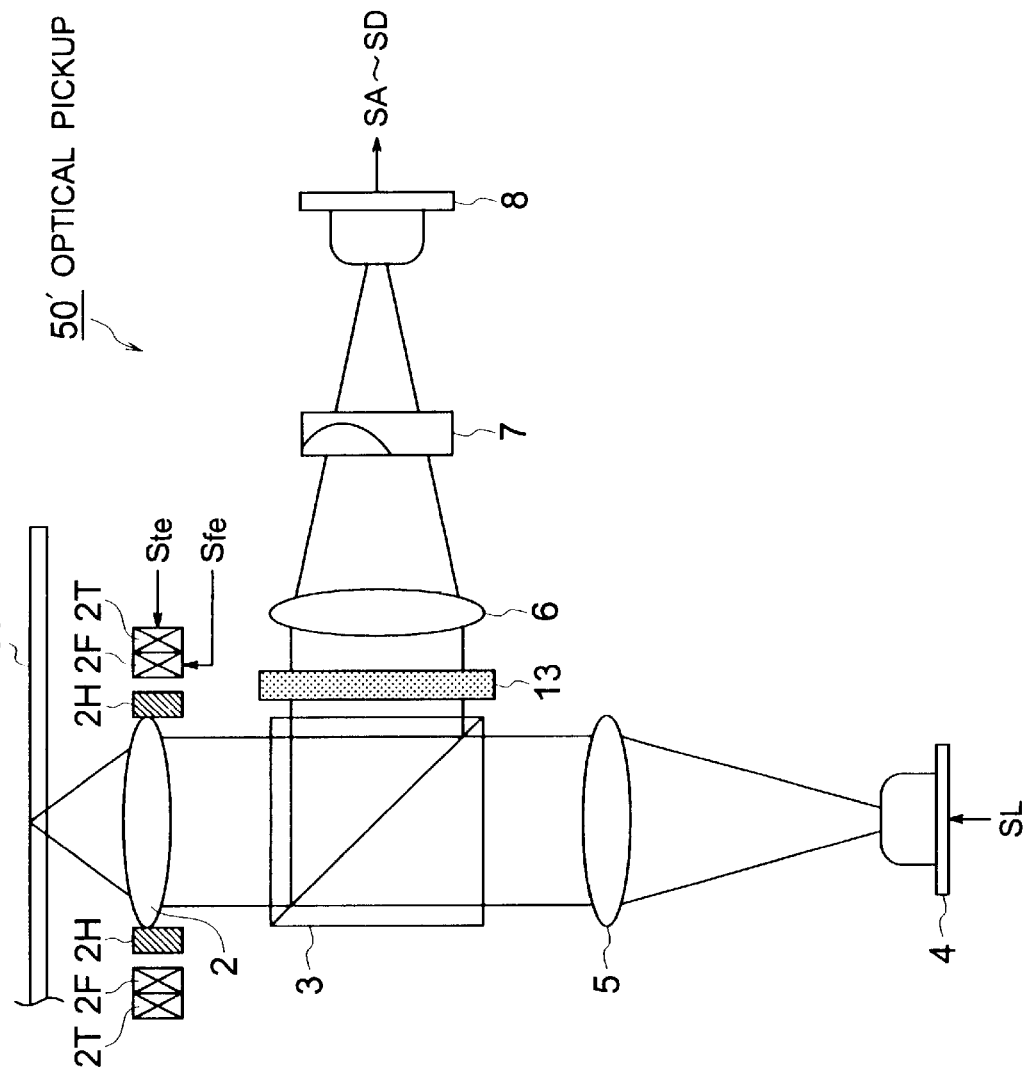
FIG. 18 is a schematic view of the configuration of a fourth embodiment of the optical pickup according to the present invention.

FIG. 18 is a schematic view of the configuration of an optical pickup according to a fourth embodiment of the present invention.

This optical pickup 50' is configured arranging a substrate 13 in place of the polarizer 9 in the optical pickup 50 of FIG. 6. In FIG. 6 and FIG. 18, the same references are attached to the same components, and the explanations of the same components are suitably omitted. Note that, in the recording and/or reproducing apparatus 90, it is also possible to use the optical pickup 50' shown in FIG. 18 in place of the optical pickup 50 of FIG. 6.

In the optical pickup 50' of FIG. 18, the beam splitter 3 is struck by the laser beam from the objective lens 2 and reflects and emits the incident laser beam to supply the same via the substrate 13 to the focus lens 6.

The focus lens 6 focuses the laser beam passed through the substrate 13 and supplies the same to the cylindrical lens 7.

The cylindrical lens 7 passes the laser beam from the focus lens 6 therethrough and supplies the same to the photo detector 8.

The photo detector 8 receives the laser beam from the cylindrical lens 7 at its light receiving portion 18S and generates the output signals SA to SF.

Figure 19:
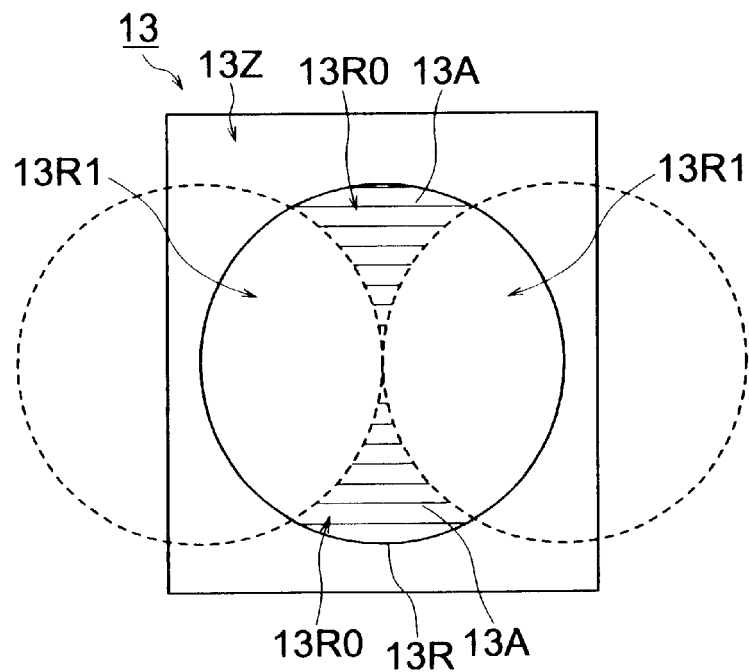
FIG. 19 is a view of the configuration of an example of the substrate in an optical pickup 50' of FIG. 18.

FIG. 19 is a view of the configuration of an example of the substrate 13 in the optical pickup 50' of FIG. 18.

The laser beam reflected at the optical disk 80 contains the 0-th order diffraction light reflected at the track and the +1st order diffraction light generated by the diffraction of the light by the lands and/or grooves.

The substrate 13 is supplied with the laser beam containing the 0-th order diffraction light and the +1st order diffraction light from the beam splitter 3.

This substrate 13 has a transparent substrate 13Z, and a light shield region 13A is provided in the transparent substrate 13Z.

The transparent substrate 13Z has an overlapping region 13R1 in which the 0-th order diffraction light and the +1st order diffraction light contained in the laser beam overlap and a nonoverlapping region 13R0 in which they do not overlap in a contour 13R. The 0-th order diffraction light is supplied to the nonoverlapping region 13R0, and the 0-th order diffraction light and the +1st order diffraction light are supplied to the overlapping region 13R1.

The light shield region 13A is provided so as to coincide with the nonoverlapping region 13R0 of the transparent substrate 13Z.

By configuring the nonoverlapping region 13R0 as the light shield region 13A, the 0-th order diffraction light supplied to the nonoverlapping region 13R0 is blocked, and the laser beam passed through the overlapping region 13R1 can be supplied to the photo detector 8.

When the laser beam passed through the substrate 13 passes through the focus lens 6 and the cylindrical lens 7 and is supplied to the photo detector 8, at the light receiving portion of the photo detector 8, interference of the laser beams passed through the overlapping region 13R1 is eliminated, so it is possible to prevent the light intensities at the time of focus from becoming asymmetric with respect to the division lines of the light receiving portion, and thus it is possible to improve the decision of detection of the focus error.

Note that, in the optical pickup 50' of FIG. 18, it is possible to affix the substrate 13 to the emitting surface for emitting the laser beam by the beam splitter 3, possible to form the substrate 13 or the light shield region 13A at the emitting surface, and possible to integrally form the beam splitter 3 and the transparent substrate 13Z.

Figure 20:
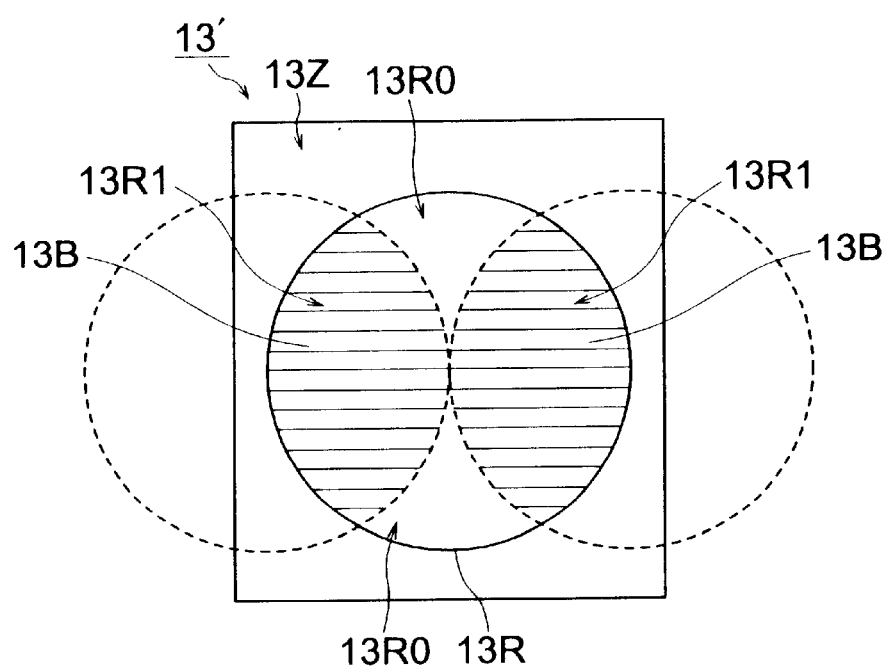
FIG. 20 is a view of the configuration of another one example of the substrate in the optical pickup 50' of FIG. 18.

As the substrate 13 in the optical pickup 50' of FIG. 18, it is also possible to use a substrate 13' shown in FIG. 20. Note that the same references are attached to the same components in FIG. 19 and FIG. 20, and the explanation of the same components will be suitably omitted.

The substrate 13' is supplied with the laser beam containing the 0-th order diffraction light and the +1st order diffraction light from the beam splitter 3.

This substrate 13' has the transparent substrate 13Z, and a light shield region 13B is provided in the transparent substrate 13Z. The light shield region 13B is provided so as to coincide with the overlapping region 13R1 of the transparent substrate 13Z.

By configuring the overlapping region 13R1 by the light shield region 13B, the 0-th order diffraction light and the +1st order diffraction light supplied to the overlapping region 13R1 are blocked, and the laser beam passed through the nonoverlapping region 13R0 can be supplied to the photo detector 8.

Where the laser beam passed through the substrate 13' passes through the focus lens 6 and the cylindrical lens 7 and is supplied to the photo detector 8, at the light receiving portion of the photo detector 8, interference of the laser beams passed through the nonoverlapplng region 13R0 is eliminated, so it is possible to prevent the light intensities at the time of focus from becoming asymmetric with respect to the division lines of the light receiving portion, and thus it is possible to improve the precision of detection of the focus error.

Note that, in the optical pickup 50' of FIG. 18, it is possible to affix the substrate 13' to the emitting surface for emitting the main laser beam by the beam splitter 3 and possible to form the substrate 13' or the light shield region 13B at the emitting surface.

Note that the embodiments are examples of the present invention. The present invention is not limited to the embodiments.

It is possible if the polarization plate is configured adhering a sheet made of an organic material having a birefringence to the transparent substrate made of a glass plate as the polarizer and possible if it is configured by adhering an artificial quartz plate or the like having the birefringence as the polarizer.

Summarizing the effects of the invention, in the first and second optical pickups and first and second recording and/or reproducing apparatuses according to the present invention, by making the direction of linear polarization of the laser beam in the overlapping region in which the 0-th order diffraction light and the 1st order diffraction light overlap and the linear polarization direction of the laser beam in the nonoverlapping region in which they do not overlap orthogonal to each other by the polarization plates, the interference of light at the photo detector can be suppressed, the focus error signal can be made to match between the case where the laser beam is focused and supplied to the land and the case where it is supplied to a groove, it is possible to make the value of the focus error signal 0 at the time of focus, and it is possible to improve the detection precision of the focus error. Further, in the first and second recording and/or reproducing apparatuses, it is possible to improve the reliability of the reproduced information by an improvement of the detection precision of the focus error.

In the third and fourth optical pickups and third and fourth recording and/or reproducing apparatuses according to the present invention, by blocking either of the laser beam in the overlapping region in which the 0-th order diffraction light and the 1st order diffraction light overlap and the laser beam in the nonoverlapping region in which they do not overlap, interference of light at the photo detector can be eliminated, the focus error signal can be made to match between the case where the laser beam is focused and supplied to a land and the case where it is supplied to a groove, it is possible to make the value of the focus error signal 0 at the time of focus, and it is possible to improve the precision of detection of the focus error. Further, the third and fourth recording and/or reproducing apparatuses can improve the reliability of the reproduced information by an improvement of the precision of detection of the focus error.

While the invention has been described with reference to specific embodiment chosen for purpose of illustration, it should be apparent that numerous modifications could be made thereto by those skilled in the art without departing from the basic concept and scope of the invention.

What is claimed is:

1. An optical pickup comprising:
   a laser for outputting a linear polarized laser beam,
   an objective lens for condensing a laser beam from said laser and supplying it to a track of an optical disk with lands and/or grooves formed therein,
   a polarization plate supplied with said laser beam reflected at said optical disk via said objective lens and polarizing an overlapping region in which a 0-th order diffraction light and a 1st order diffraction light contained in said supplied laser beam overlap and a nonoverlapping region to linear polarized light orthogonal or substantially orthogonal to each other, and
   a photo detector supplied with the laser beam passed through said polarization plate.

2. An optical pickup as set forth in claim 1, further comprising a cylindrical lens supplied with said laser beam passed through said polarization plate, wherein said photo detector has a light receiving portion for receiving said laser beam passed through said cylindrical lens, wherein the related light receiving portion is equally divided to four or substantially equally divided to four by two orthogonal division lines, wherein an intersecting point of said two division lines is arranged at the center or substantially the center of said laser beam passed through said cylindrical lens, and wherein a direction of a said division line and a direction of a generatrix of said cylindrical lens form an angle of about 45 degrees or about 135 degrees.

3. An optical pickup as set forth in claim 1, further comprising:

a collimator lens for collimating said laser beam output from said laser to a parallel beam; and a beam splitter supplied with said laser beam as a parallel beam from said collimator lens, wherein said objective lens condenses said, laser beam passed through said beam splitter, supplies the same to said optical disk, and returns said laser beam reflected at said optical disk to said beam splitter, and wherein said beam splitter supplies said laser beam from said objective lens to said polarization plate.

4. A recording and/or reproducing apparatus comprising:

a laser for outputting a linear polarized laser beam, an objective lens for condensing a laser beam from said laser and supplying the same to a track of an optical disk with lands and/or grooves formed therein, a polarization plate supplied with said laser beam reflected at said optical disk via said objective lens and polarizing an overlapping region in which a 0-th order diffraction light and a 1st order diffraction light contained in said supplied laser beam overlap and a non-overlapping region to linear polarized light orthogonal or substantially orthogonal to each other, a photo detector supplied with the laser beam passed through said polarization plate, a generation circuit for generating a focus error signal and a reproduction signal based on an output signal of said photo detector, a detection circuit for detecting recorded information of said optical disk based on said reproduction signal, and an actuator for moving said objective lens in a focus direction vertical to the recording surface of said optical disk based on said focus error signal.

5. A recording and/or reproducing apparatus as set forth in claim 4, further comprising a cylindrical lens supplied with said laser beam passed through said polarization plate, wherein said photo detector has a light receiving portion for receiving said laser beam passed through said cylindrical lens, wherein the related light receiving portion is equally divided to four or substantially equally divided to four by two orthogonal division lines, wherein an intersecting point of said two division lines is arranged at the center or substantially the center of said laser beam passed through said cylindrical lens, wherein a direction of a said division line and a direction of a generatrix of said cylindrical lens form an angle of about 45 degrees or about 135 degrees, and wherein said generation circuit generates said focus error signal based on a difference between a sum of output signals of two divided regions located in one diagonal direction among four divided regions obtained by dividing said light receiving portion and a sum of the output signals of two divided regions located in the other diagonal direction and generates said reproduction signal based on a sum of the output signals of said four divided regions.

6. A recording and/or reproducing apparatus as set forth in claim 5, further comprising:

a collimator lens for collimating said laser beam output from said laser to a parallel beam; and a beam splitter supplied with said laser beam as a parallel beam from said collimator lens, wherein said objective lens condenses said laser beams passed through said beam splitter, supplies the same to said optical disk, and returns said laser beam reflected at said optical disk to said beam splitter, and wherein said beam splitter supplies said laser beam from said objective lens to said polarization plate.

* * * * *